US009724931B2

(12) United States Patent
Suzuki et al.

(10) Patent No.: US 9,724,931 B2
(45) Date of Patent: Aug. 8, 2017

(54) IMAGE PROCESSING DEVICE AND COMPUTER-READABLE STORAGE MEDIUM STORING COMPUTER-READABLE PROGRAM

(71) Applicant: BROTHER KOGYO KABUSHIKI KAISHA, Nagoya-shi, Aichi-ken (JP)

(72) Inventors: Yukinori Suzuki, Nagoya (JP); Masaki Kondo, Toyoake (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/280,166

(22) Filed: Sep. 29, 2016

(65) Prior Publication Data
US 2017/0087869 A1   Mar. 30, 2017

(30) Foreign Application Priority Data

Sep. 29, 2015   (JP) .................... 2015-192197

(51) Int. Cl.
B41J 29/38   (2006.01)
B41J 2/21   (2006.01)
H04N 1/60   (2006.01)

(52) U.S. Cl.
CPC .......... B41J 2/2103 (2013.01); H04N 1/6005 (2013.01); H04N 1/6058 (2013.01); H04N 1/6097 (2013.01); *H04N 2201/0094* (2013.01)

(58) Field of Classification Search
CPC ..................................................... B41J 2/2103
See application file for complete search history.

(56) References Cited

U.S. PATENT DOCUMENTS

| 5,428,377 A | 6/1995 | Stoffel et al. |
| 6,084,604 A | 7/2000 | Moriyama et al. |
| 2009/0315944 A1* | 12/2009 | Maru ............... B41J 2/2056 347/43 |
| 2010/0195161 A1 | 8/2010 | Kondo |

FOREIGN PATENT DOCUMENTS

| JP | H06-113155 A | 4/1994 |
| JP | H06-206370 A | 7/1994 |
| JP | H10-86503 A | 4/1998 |
| JP | 2003-220717 A | 8/2003 |
| JP | 2010-176461 A | 8/2010 |

* cited by examiner

Primary Examiner — Juanita D Jackson
(74) Attorney, Agent, or Firm — Scully, Scott, Murphy & Presser, P.C.

(57) ABSTRACT

The image processing device executes first correction process and second correction process. The first correction process comprises correcting a pixel value corresponding to a first partial area, which is included in the achromatic-color representation area and is adjacent to the chromatic-color representation area, such that the achromatic color ink in the first partial area decreases to be zero, at least one of the three or more types of chromatic color inks increases, and the pixel value represents the achromatic color. The second correction process comprises correcting a pixel value corresponding to a second partial area, which is included in the achromatic-color representation area and is adjacent to the first partial area and is remote from the chromatic-color representation area, such that the achromatic color ink in the second partial area decreases to a specific value more than zero, at least one of the three or more types of chromatic color inks increases, and the pixel value represents the achromatic color.

17 Claims, 13 Drawing Sheets

Fig. 4A 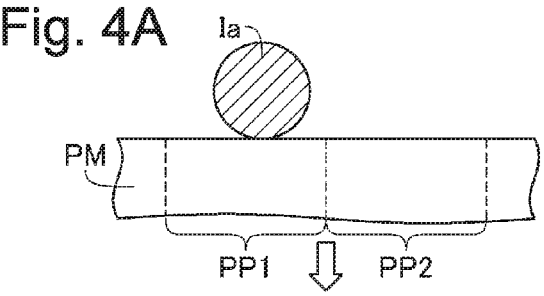 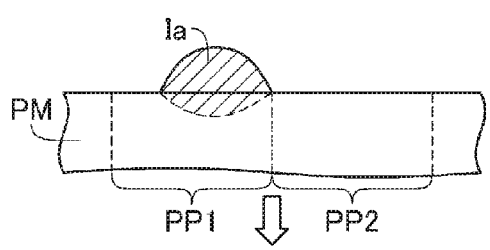 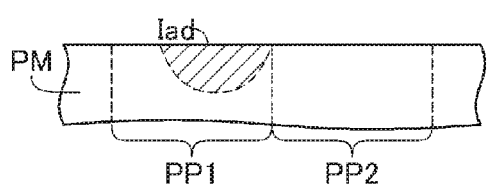
Fig. 4B 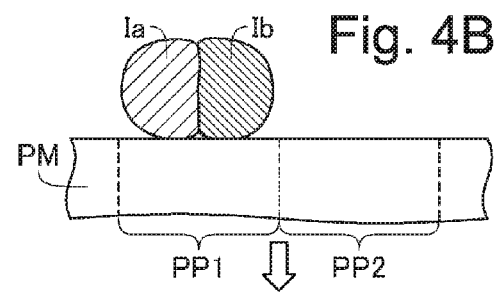 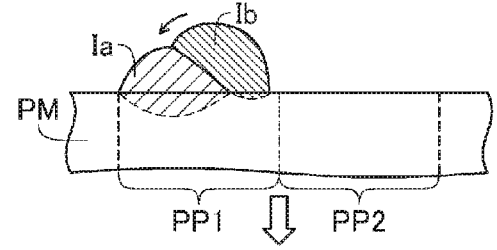 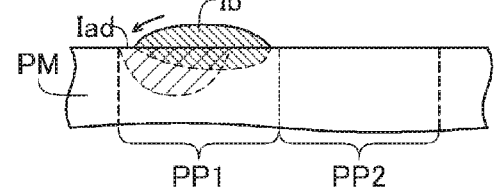
Fig. 4C 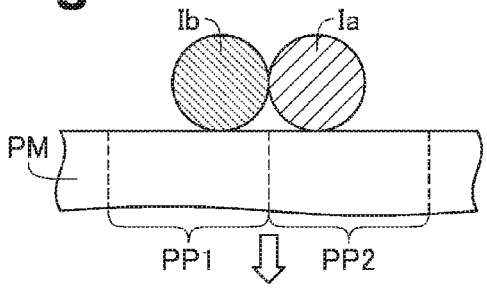 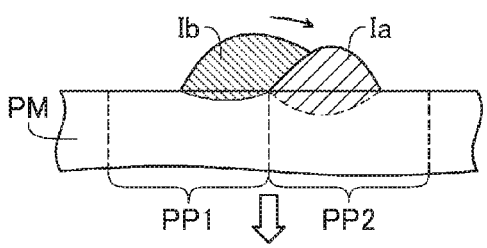 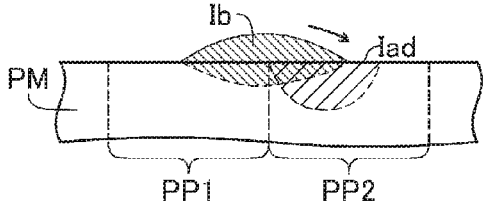
Fig. 4D 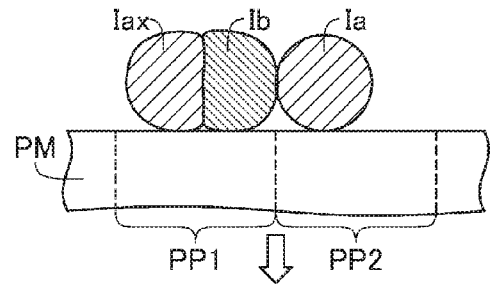 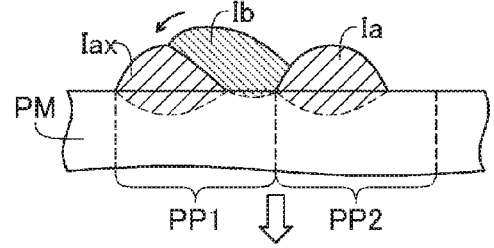 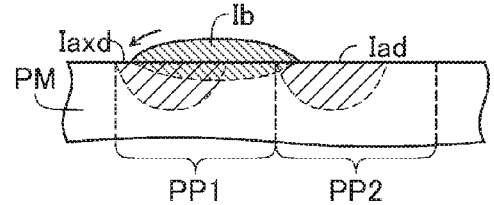

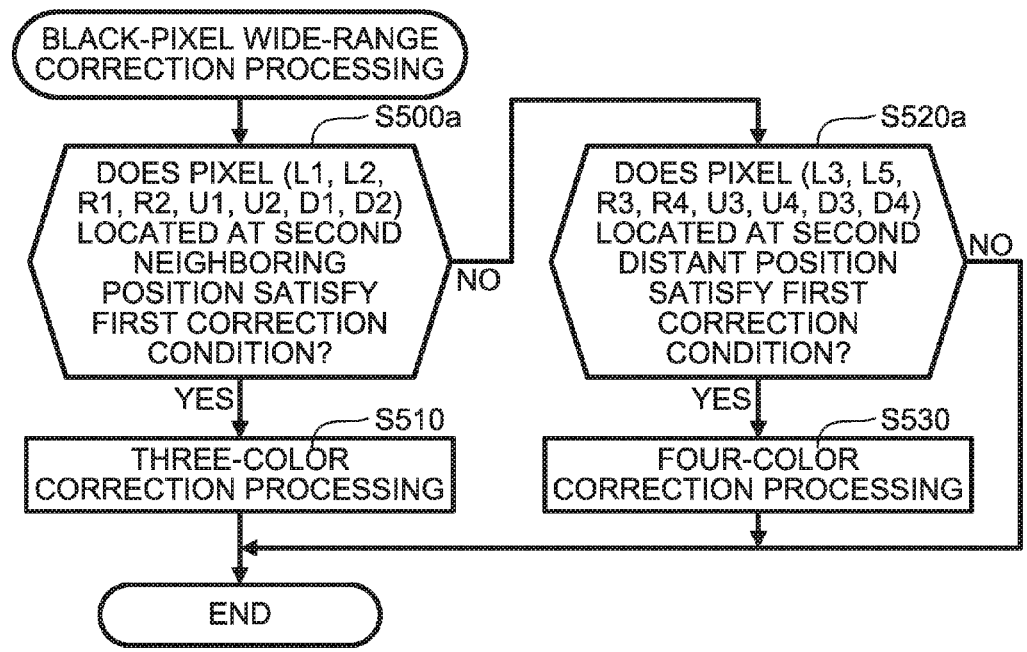

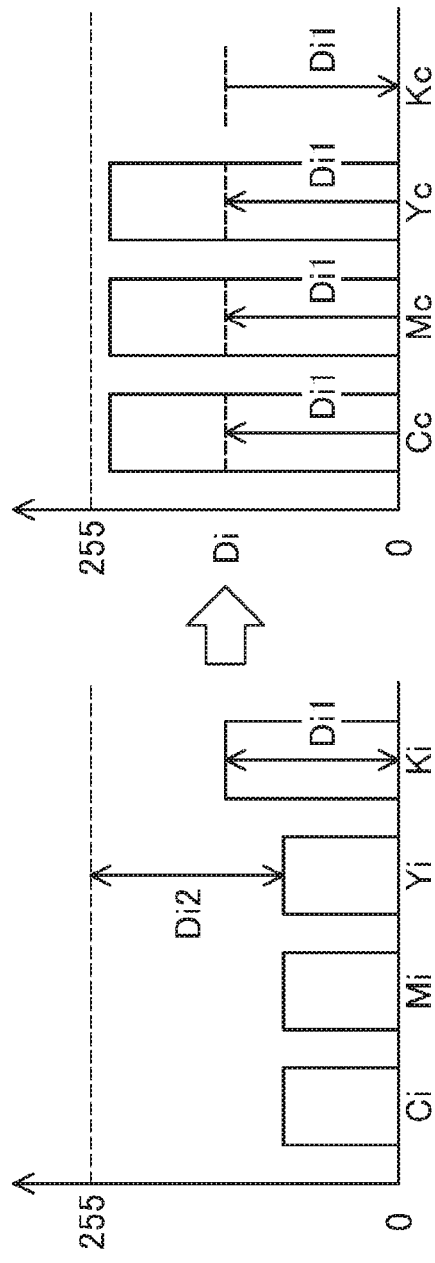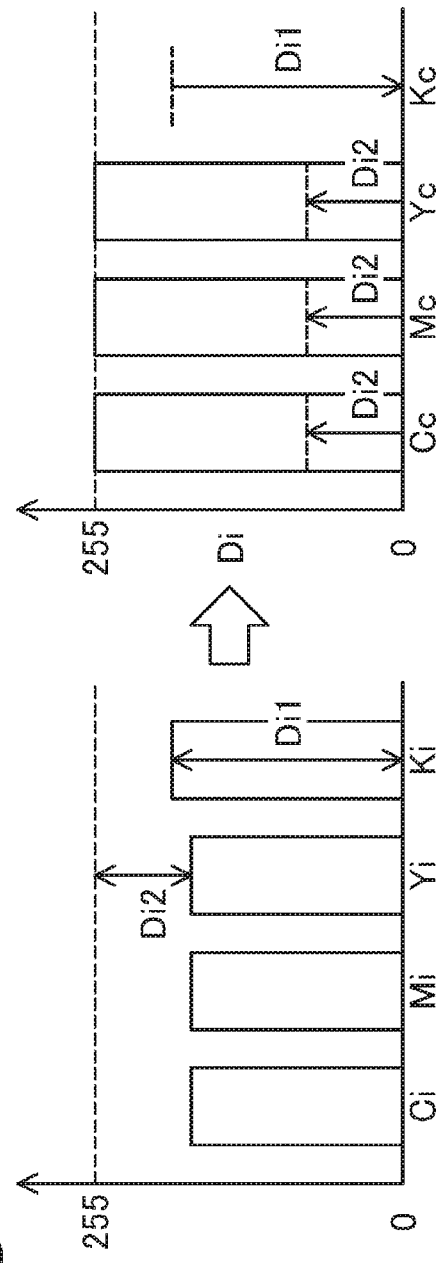

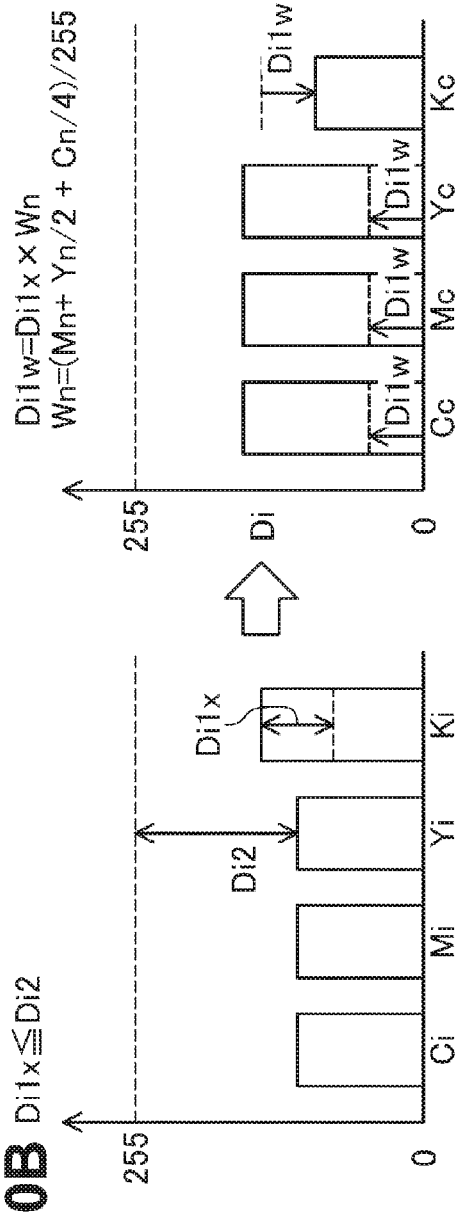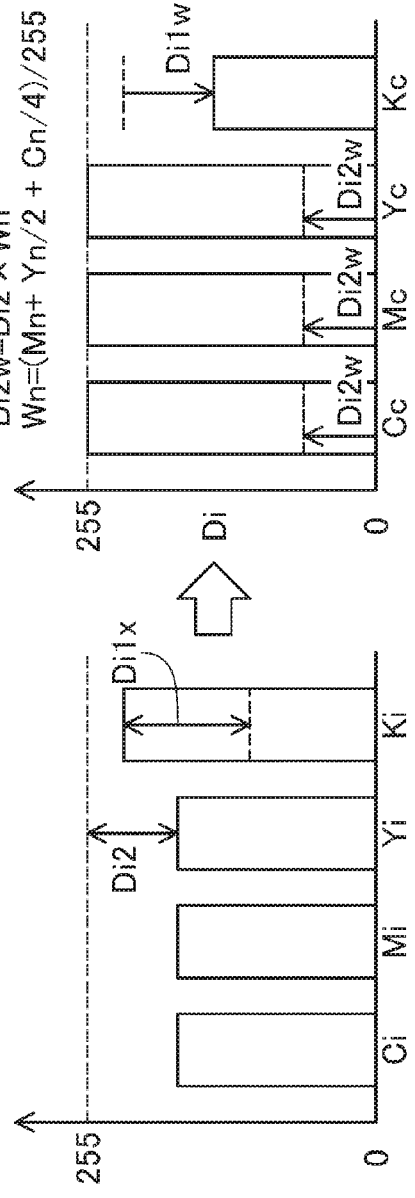

IMAGE PROCESSING DEVICE AND COMPUTER-READABLE STORAGE MEDIUM STORING COMPUTER-READABLE PROGRAM

CROSS-REFERENCE TO RELATED APPLICATION

This application claims priority from Japanese Patent Application No. 2015-192197, filed on Sep. 29, 2015, which is incorporated herein by reference in its entirety.

TECHNICAL FIELD

The disclosure relates to a technique for printing an image.

BACKGROUND

There has been known a technique for reducing ink bleeding caused during printing of an image onto a sheet by ink ejection. FIG. 1 is a schematic diagram depicting a reference example of such a technique. In FIG. 1, a boundary between an area AR1 for black and an area AR2 for color other than black is illustrated. A rectangle PX represents a pixel. Ink color assigned for print processing is represented in each pixel using one or more symbols of K (black), C (cyan), M (magenta), and Y (yellow). For example, "K" represents black ink and "CY" represents cyan and yellow inks. Pixels PXa and PXb are included in the black area AR1. Each of the pixels PXa and PXb is assigned with black ink and represents black. A pixel representing color other than black is present in the neighborhood of the pixel PXa (i.e., a pixel representing color other than black is located adjacent to the pixel PXa). In print processing corresponding to the pixel PXa, C, M, and Y inks are used to represent black in the pixel PXa. Only pixels representing black are present in the neighborhood of the pixel PXb (i.e., no pixel representing color other than black is located adjacent to the pixel PXb). In print processing corresponding to the pixel PXb, K ink is used to represent black in the pixel PXb. As described above, of a plurality of pixels included in the black area AR1, with respect to a pixel (e.g., the pixel PXa) having a neighboring pixel representing color other than black, ink to be used for the pixel is changed from K to a combination of C, M, and Y for representing black. Therefore, one or more of C, M, and Y inks to be ejected corresponding to a pixel representing a color other than black may be avoided contacting K ink to be ejected corresponding to a pixel representing black. Accordingly, intrusion of K ink in a pixel area representing black into another pixel area representing color other than black (e.g., an area onto which one or more of C, M, and Y inks are ejected), that is, an occurrence of ink bleeding, may be reduced.

Nevertheless, in the known technique illustrated in FIG. 1, while the pixels PXa and PXb both represent black, the color of the pixel PXa may be represented by C, M, and Y and the color of the pixel PXb that is diagonally adjacent to the pixel PXa may be represented by K. Therefore, the color of the pixel PXa represented by C, M, and Y may be recognized lighter than the color of the pixel PXb represented by K. If the color of the pixel PXa is recognized lighter than the color of the pixel PXb, a difference in depth of color between the adjacent pixels PXa and PXb may become obtrusive and color may look unnatural. Such a problem may occur not only at a boundary between a black area and a color area but also a boundary between an achromatic color area represented by an achromatic color ink and a chromatic color area represented by three or more chromatic color ink having respective different colors.

SUMMARY

Some embodiments of the disclosure provide for a technique for reducing bleeding of color ink and reducing unnatural-looking transition in color in the vicinity of a boundary between an achromatic color area and a chromatic color area.

One illustrative aspect of the disclosure may provide an image processing device comprising: a hardware processor configured to cause the image processing device to perform: acquiring target image data; generating print data by using the target image data; supplying the print data to a print execution unit for causing the print execution unit to print, the print execution unit having a plurality of nozzles, each of which ejects one of a plurality of color inks, the plurality of color inks including an achromatic color ink and three or more types of chromatic color inks, colors of which are different from each other; wherein a target image represented by the target image data includes a chromatic-color representation area and an achromatic-color representation area, the chromatic-color representation area representing the chromatic color, and the achromatic-color representation area representing the achromatic color, wherein the generating print data comprises executing a correction process, the correction process being for correcting a plurality of pixel values in the target image data corresponding to the achromatic-color representation area, wherein the correction process includes a first correction process and a second correction process, wherein the first correction process comprises correcting a pixel value of a first target pixel in the target image data corresponding to a first partial area, which is included in the achromatic-color representation area and is adjacent to the chromatic-color representation area, such that the achromatic color ink which is to be ejected on a first print unit area in the first partial area corresponding to the first target pixel decreases to be zero, wherein at least one of the three or more types of chromatic color inks which is to be ejected on the first print unit area corresponding to the first target pixel increases, and wherein the first print unit area represents the achromatic color, wherein the second correction process comprises correcting a pixel value of a second target pixel in the target image data corresponding to a second partial area, which is included in the achromatic-color representation area and is adjacent to the first partial area and is remote from the chromatic-color representation area, such that the achromatic color ink which is to be ejected on a second print unit area in the second partial area corresponding to the second target pixel decreases to a specific value more than zero, wherein at least one of the three or more types of chromatic color inks which is to be ejected on the print unit area corresponding to the second target pixel increases, and wherein the second print unit area represents the achromatic color.

According to one or more aspects of the disclosure, in a first partial area adjacent to a chromatic-color representation area, the amount of achromatic color ink may be reduced to zero and the amount of at least one of the chromatic color inks is increased. Therefore, bleeding of achromatic color ink that may occur between the chromatic-color representation area and the first partial area may be reduced. In the second partial area of the chromatic-color representation area, the amount of achromatic color ink may be reduced to a value greater than zero and the amount of at least one of the chromatic color inks is increased. Therefore, bleeding of the achromatic color ink in the second partial area into the first partial area and the chromatic-color representation area may be reduced. In the second partial area, as well as the amount of at least one of the chromatic color inks, the amount of achromatic color ink may be larger than zero. Therefore, as compared with a case where the amount of achromatic color ink is zero, a deeper achromatic color may be represented in the second partial area. As described above, bleeding of color ink that may occur at a boundary between the chromatic-color representation area and the chromatic-color representation area may be reduced. Accordingly, unnatural-looking color in a print result that may be caused by an obstructiveness of difference in depth of achromatic color may be reduced.

One or more aspects of the disclosure may be accomplished in various manners, such as using image processing methods, computer-readable programs for implementing image processing methods, or recording media (e.g., non-transitory recording media) recording the computer-readable programs, as well as image processing devices.

BRIEF DESCRIPTION OF THE DRAWINGS

For a more complete understanding of the present disclosure, and the objects, features, and advantages thereof, reference now is made to the following descriptions taken in connection with the accompanying drawings.

FIGS. 4A, 4B, 4C, and 4D are explanatory diagrams each illustrating a principle of occurrence of ink bleeding in the illustrative embodiment according to one or more aspects of the disclosure.

FIGS. 7A, 7B, and 7C are flowcharts depicting example black pixel correction processing in the illustrative embodiment according to one or more aspects of the disclosure.

FIGS. 9A and 9B are explanatory diagrams illustrating example three-color correction processing in the illustrative embodiment according to one or more aspects of the disclosure.

FIGS. 10A, 10B, and 10C are explanatory diagrams illustrating example four-color correction processing in the illustrative embodiment according to one or more aspects of the disclosure.

DETAILED DESCRIPTION

Figure 1:
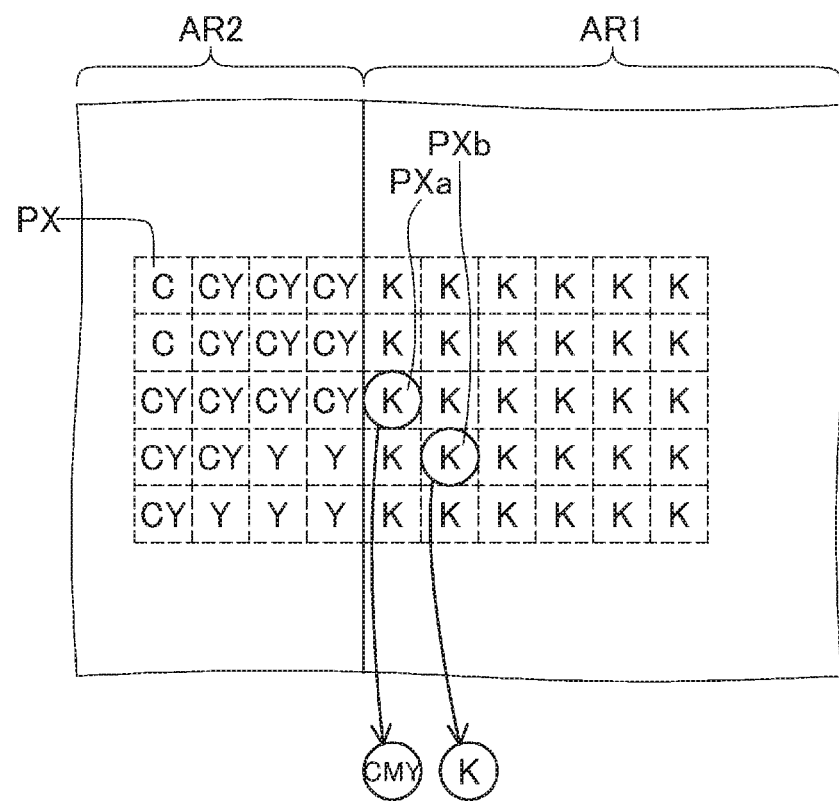
FIG. 1 is a schematic diagram depicting an example reference technique.

Hereinafter, an illustrative embodiment will be described in detail with reference to the accompanying drawings, like reference numerals being used for like corresponding parts in the various drawings.

A. Illustrative Embodiment

A1. System Configuration

Figure 2:
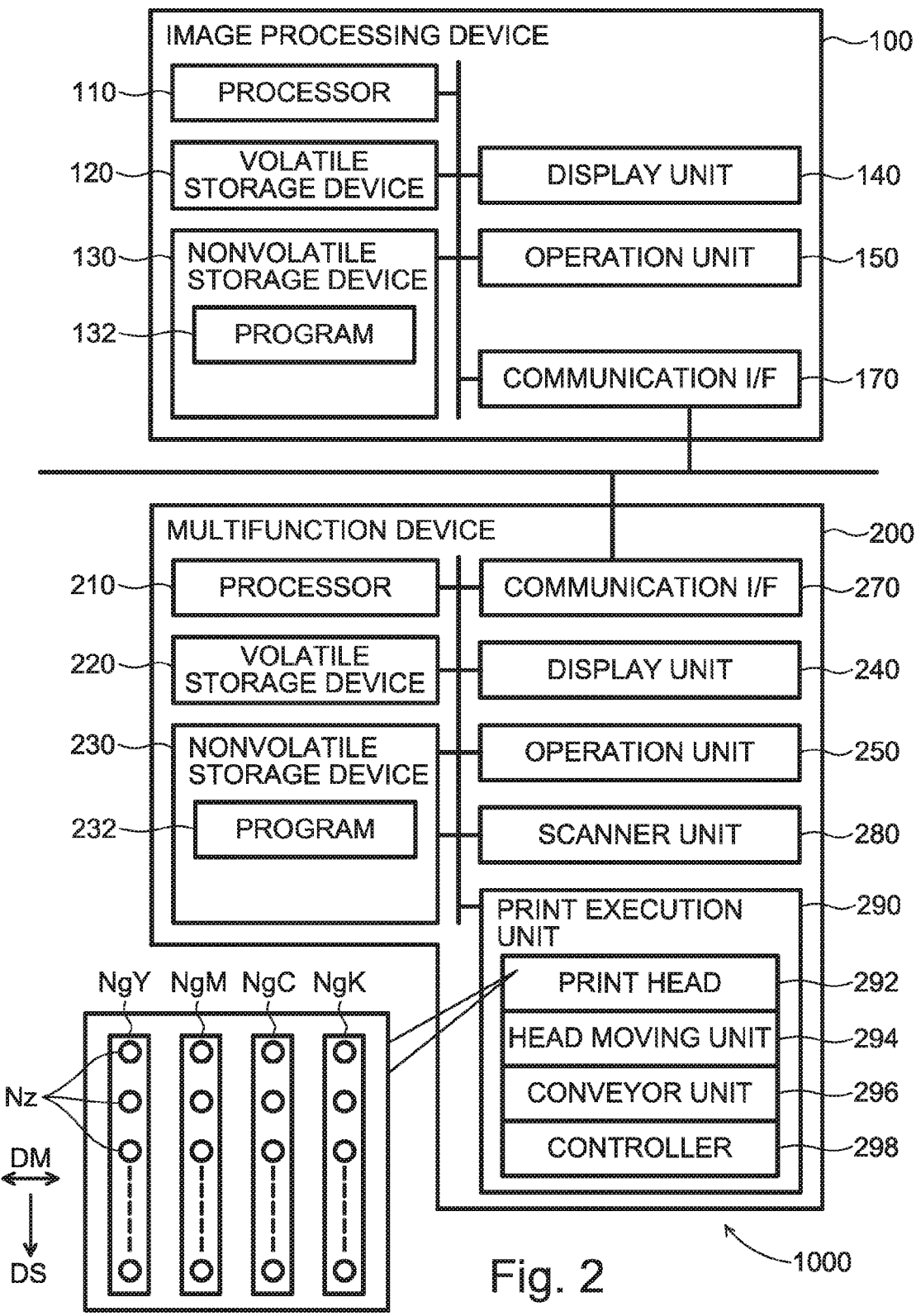
FIG. 2 is an explanatory diagram illustrating an image processing system in an illustrative embodiment according to one or more aspects of the disclosure.

FIG. 2 is an explanatory diagram illustrating an image processing system 1000 according to the illustrative embodiment. The image processing system 1000 includes an image processing device 100 and a multifunction device 200 connected to the image processing device 100. The multifunction device 200 includes a print execution unit 290 for printing an image.

The image processing device 100 may be a personal computer (e.g., a desktop computer or a tablet computer). The image processing device 100 includes a processor 110, a volatile storage device 120, a nonvolatile storage device 130, a display unit 140, an operation unit 150, and a communication interface ("I/F") 170, which are connected to each other via a bus. The display unit 140 is configured to display an image thereon. The operation unit 150 is configured to accept a user operation.

The processor 110 is configured to execute data processing. The processor 110 may be, for example, a central processing unit ("CPU"). The volatile storage device 120 may be, for example, a dynamic random-access memory ("DRAM"). The nonvolatile storage device 130 may be, for example, a flash memory.

The nonvolatile storage device 130 stores a program 132 therein. The processor 110 implements various functions by executing the program 132. The processor 110 is configured to store various intermediate data used during execution of the program 132 in a storage device (e.g., the volatile storage device 120 or the nonvolatile storage device 130) temporarily. In the illustrative embodiment, the program 132 is included in a device driver supplied by a manufacturer of the multifunction device 200.

The display unit 140 is configured to display an image thereon. The display unit 140 may be, for example, a liquid crystal display. The operation unit 150 is configured to accept a user operation. The operation unit 150 may be, for example, a touch panel disposed over the display unit 140. The operation unit 150 enables the user to provide various instructions to the image processing device 100 through operation of the operation unit 150.

The communication interface 170 is configured to allow the image processing device 100 to communicate with another device. The communication interface 170 may be, for example, a Universal Serial Bus ("USB") interface, a wired local-area network ("LAN") interface, or a wireless interface compliant with IEEE802.11. The multifunction device 200 is connected to the communication interface 170.

The image processing device 100 drives the multifunction device 200 to allow the multifunction device 200 to print an image in accordance with a user instruction.

The multifunction device 200 includes a processor 210, a volatile storage device 220, a nonvolatile storage device 230, a display unit 240, an operation unit 250, a communication interface ("I/F") 270, a scanner unit 280, and the print execution unit 290, which are connected to each other via a bus. The display unit 240 is configured to display an image thereon. The operation unit 250 is configured to accept a user operation.

The processor 210 is configured to execute data processing. The processor 210 may be, for example, a CPU. The volatile storage device 220 may be, for example, a DRAM. The nonvolatile storage device 230 may be, for example, a flash memory.

The nonvolatile storage device 230 stores a program 232 therein. The processor 210 implements various functions by executing the program 232. The processor 210 is configured to store various intermediate data used during execution of the program 232 in a storage device (e.g., the volatile storage device 220 or the nonvolatile storage device 230) temporarily. In the illustrative embodiment, the program 232 is prestored as firmware in the nonvolatile storage device 230 by the manufacturer of the multifunction device 200.

The display unit 240 is configured to display an image thereon. The display unit 240 may be, for example, a liquid crystal display. The operation unit 250 is configured to accept a user operation. The operation unit 250 may be, for example, a touch panel disposed over the display unit 240. The operation unit 250 enables the user to provide various instructions to the multifunction device 200 through operation of the operation unit 250.

The communication interface 270 is configured to allow the multifunction device 200 to communicate with another device. In the illustrative embodiment, the communication interface 270 is connected to the communication interface 170 of the image processing device 100.

The scanner unit 280 is configured to read an object, e.g., a document, optically using a photoelectric conversion element, such as a charge-coupled device ("CCD") or a complementary metal oxide semiconductor ("CMOS") and to generate scan data that represents the read object image (hereinafter, referred to as a "scan image"). Scan data may be, for example, RGB bitmap data representing a color scan image.

The print execution unit 290 is configured to print an image onto a sheet (as an example of a recording medium). The sheet may be a sheet of paper. The print execution unit 290 includes a print head 292, a head moving unit 294, a conveyor unit 296, and a controller 298. The controller 298 controls the print head 292, the head moving unit 294, and the conveyor unit 296. The head moving unit 294 is configured to reciprocate the print head 292 parallel to a main scanning direction DM. The conveyor unit 296 is configured to convey a sheet in a sub-scanning direction DS relative to the print head 292.

FIG. 2 illustrates an example of a nozzle arrangement pattern in a lower surface of the print head 292. The print head 292 includes a nozzle group NgC, a nozzle group NgM, a nozzle group NgY, and a nozzle group NgK defined in the lower surface thereof. The nozzle group NgC is for ejecting cyan C ink. The nozzle group NgM is for ejecting magenta M ink. The nozzle group NgY is for ejecting yellow Y ink. The nozzle group NgK is for ejecting black K ink. Each of the nozzle groups NgC, NgM, NgY, and NgK includes a plurality of nozzles Nz, which are located at respective different positions with respect to the sub-scanning direction DS. The print execution unit 290 prints an image in a band-shaped area extending in the main scanning direction DM on a sheet by ejecting ink droplets onto the sheet from appropriate ones of the nozzles Nz of the nozzle groups NgC, NgM, NgY, and NgK while moving the print head 292 in the main scanning direction DM. The print execution unit 290 prints an image onto the sheet by alternating ejection of ink onto a band-shaped area and conveyance of the sheet in the sub-scanning direction DS. In the illustrative embodiment, achromatic color may be represented by mixture of equal amounts of cyan C ink, magenta M ink, and yellow Y ink.

The multifunction device 200 is capable of causing the print execution unit 290 to print an image using print data supplied from another device (e.g., the image processing device 100). The multifunction device 200 optically reads an object and generates scan data representing the object by driving the scanner unit 280 in response to a user instruction. The multifunction device 200 is capable of causing the print execution unit 290 to print an image represented by the scan data.

A2. Print Processing

Figure 3:
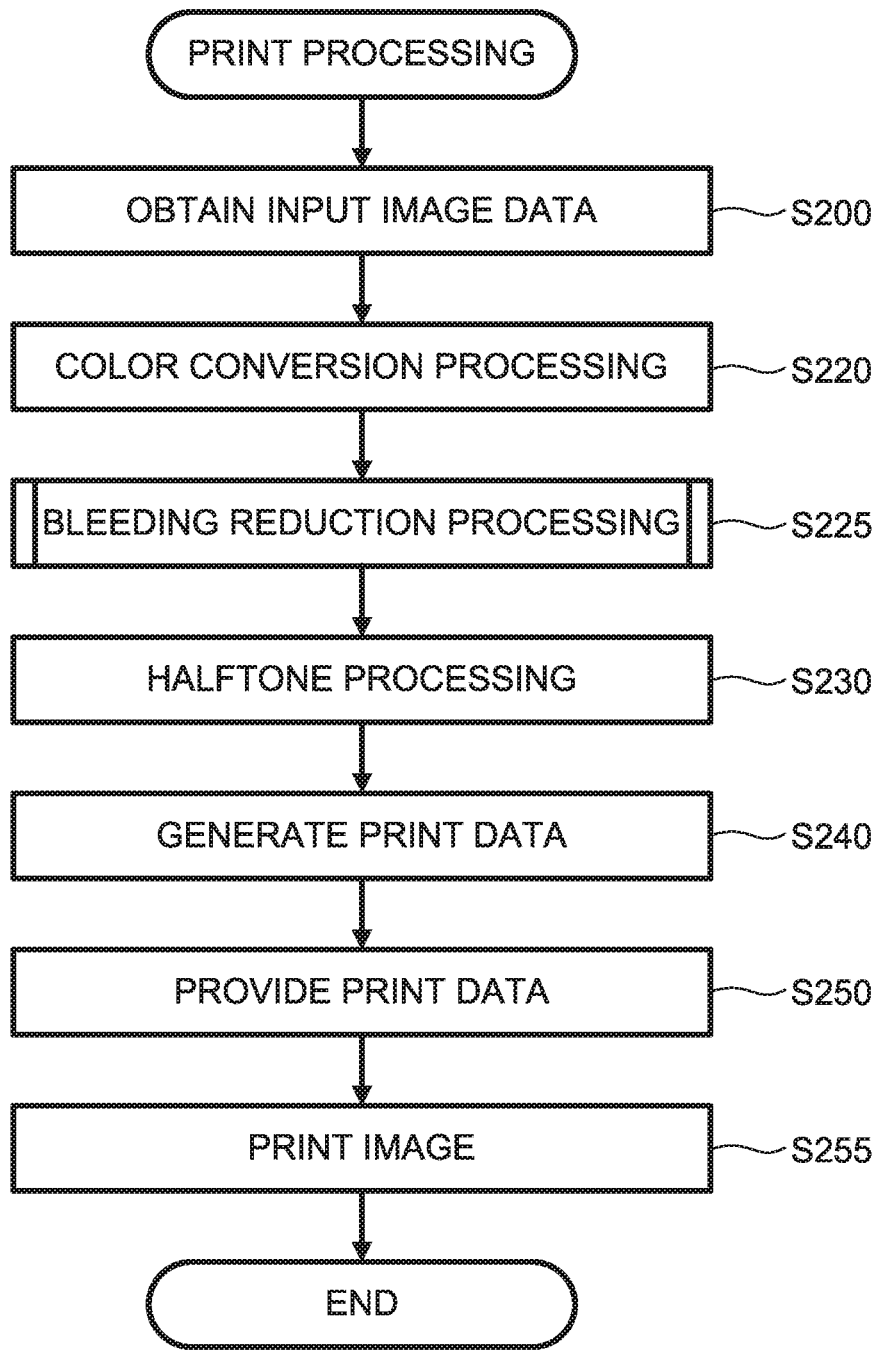
FIG. 3 is a flowchart depicting an example procedure of print processing in the illustrative embodiment according to one or more aspects of the disclosure.

FIG. 3 is a flowchart depicting an example procedure of print processing. In the illustrative embodiment, the processor 110 of the image processing device 100 executes the print processing of FIG. 3 in accordance with the program 132. The processor 110 starts the print processing of FIG. 3 in response to a print start instruction provided by the user through the operation unit 150.

The user is allowed to select a recording media type and print quality for print settings. The recording media type includes, for example, "plain paper", "glossy paper", and "matte paper", from which the user can select one. "Plain paper" includes "plain paper on which ink tends to dry quickly (hereinafter, referred to as "quick-dry paper")" and "plain paper on which ink tends to take longer to dry (hereinafter, referred to as "slow-dry paper")", from which the user can select one. The print quality includes, for example, "Fine" and "Fast", from which the user can select one. Based on the selection of "Fine" for print quality, a pixel density for print processing is specified to a predetermined fine pixel density (hereinafter, also referred to as a "high pixel density"). Based on the selection of "Fast" for print quality, the pixel density for print processing is specified to a predetermined rough pixel density (hereinafter, also referred to as a "low pixel density"). The pixel density is represented by, for example, multiplication of a pixel density in the main scanning direction DM and a pixel density in the sub-scanning direction DS. The high pixel density may be, for example, 1200×600 dpi (dots per inch). The low pixel density may be, for example, 600×300 dpi.

In step S200, the processor 110 acquires image data representing an input image to be printed (hereinafter, also referred to as "input image data"). For example, the processor 110 acquires image data specified by a print start instruction from the user or from an application program, as input image data. In the illustrative embodiment, it is assumed that the input image data is bitmap data and a pixel value of each pixel included in the input image data is represented by tone values of R (red), G (green), and B (blue) each having one of 256 tones between 0 and 255. In a case that the specified image data is in another format (e.g., an EMF ("EMF" stands for Enhanced Meta File) format) than the bitmap format, the processor 110 uses, as input image data, bitmap data generated by data format conversion (e.g., rasterization). In a case that a pixel density of image data differs from the pixel density for print processing, the processor 110 executes processing for converting the pixel density of the image data to an equal density to the pixel density for print processing. Hereinafter, each pixel having the pixel density for print processing is also referred to as a print pixel.

In step S220, the processor 110 converts the pixel value of each of the print pixels of the input image data from R, G, and B tone values to C, M, Y, and K tone values corresponding to color components of color inks for printing. In the illustrative embodiment, the C, M, Y, and K tone values are represented by respective color component values each having one of 256 tones between 0 and 255. A correspondence between R, G, B and C, M, Y, K is predetermined in a lookup table (not depicted) prestored in the nonvolatile storage device 130. The processor 110 executes color conversion processing with reference to the lookup table.

In step S225, the processor 110 executes bleeding reduction processing. In the bleeding reduction processing, the C, M, Y, and K tone values of each print pixel included in a boundary between an area for representing chromatic color and an area for representing achromatic color, are corrected. This correction may reduce ink bleeding and an obstructiveness of difference in depth of achromatic color.

In step S230, the processor 110 executes halftone processing using the image data processed in step S225. In the illustrative embodiment, the halftone processing is executed in accordance with an error diffusion method. In other embodiments, for example, the halftone processing may be executed in accordance with a dither matrix method. Through the halftone processing, a dot formation pattern in each of one or more ejection areas associated with each of the print pixels is determined. The pixel value may include data representing the dot formation pattern.

In step S240, the processor 110 generates print data using the results of the halftone processing. The print data may be in a particular format interpretable by the controller 298 of the print execution unit 290 of the multifunction device 200. The print data includes information representing the results (e.g., the ink dot patterns) of the halftone processing, and represents the input image.

In step S250, the processor 110 provides the generated print data to the multifunction device 200. The processor 210 of the multifunction device 200 provides the received print data to the print execution unit 290. In step S255, the controller 298 of the print execution unit 290 prints an image in accordance with the received print data by controlling the print head 292, the head moving unit 294, and the conveyor unit 296. In response to completion of printing, the processor 110 ends the print processing of FIG. 3.

A3. Ink Bleeding

FIGS. 4A, 4B, 4C, and 4D are explanatory diagrams each illustrating a principle of occurrence of conceivable ink bleeding. FIGS. 4A, 4B, 4C, and 4D each illustrate a cross section of a sheet PM, one or more of ink droplets Ia, Iax, and Ib and one or more ink dots Iad, Iaxd, and Ibd. The ink droplets Ia, Iax, and Ib represent respective ink droplets landed on the sheet PM by ejection. The ink dots Iad, Iaxd, and Ibd represent respective ink dots formed on the sheet PM as a result of permeation of the ink droplets Ia, Iax, and Ib, respectively, into the sheet PM. FIGS. 4A, 4B, 4C, and 4D each illustrate a process of ink dot formation as a result of permeation of solvent (e.g., water) of one or more ink droplets Ia, Iax, and Ib into the sheet PM. In each of FIGS. 4A, 4B, 4C, and 4D, a state changes chronologically from top to bottom. FIGS. 4A, 4B, 4C, and 4D each illustrates a portion of the sheet PM which corresponds to two pixel areas PP1 and PP2 corresponding to two print pixels. The pixel areas PP1 and PP2 are adjacent to each other. A single combination of C, M, Y, and K tone values is associated with a single print pixel. A unit area in which a single dot may be formed is referred to as an "ejection area". A dot formation pattern (including the presence or absence of a dot and a dot size) of each of a variety of available inks is determined on an ejection area basis. A variety of dots (e.g., four colors of dots (e.g., C, M, Y, and K ink dots)) may be formed in a single ejection area. In each of FIGS. 4A, 4B, 4C, and 4D, for simplicity in explanation, a single pixel area corresponding to a single print pixel corresponds to a single ejection area. In the illustrative embodiment, a plurality of ejection areas are associated with a single pixel area corresponding to a single print pixel. In this case, a dot formation pattern of each of the ejection areas associated with the single print pixel (i.e., dot formation patterns for the ejection areas) is determined in accordance with the C, M, Y, and K tone values of the print pixel. In the illustrative embodiment, an image to be printed is represented by print pixels arranged in a matrix (i.e., by ejection areas arranged in a matrix).

FIG. 4A illustrates a case in which a first-type ink droplet Ia of first-type ink is ejected onto a first pixel area PP1. A solvent of the first-type ink droplet Ia gradually permeates the sheet PM and thus an ink dot Iad is formed in the first pixel area PP1. Hereinafter, permeation of a solvent of an ink droplet into the sheet PM is simply referred to as permeation of an ink droplet into the sheet PM. Generally, dye ink permeates the sheet PM faster than pigment ink. Colorant used in pigment ink tends to fix on a surface of the sheet PM faster than colorant used in dye ink.

FIG. 4B illustrates a case in which a first-type ink droplet Ia of first-type ink and a second-type ink droplet Ib of second-type ink are ejected onto the same first pixel area PP1. It is assumed that the second-type ink droplet Ib permeates slower than the first-type ink droplet Ia. The difference in permeation speed may be caused due to the difference in type of ink (e.g., color difference).

The first-type ink droplet Ia permeates the sheet PM to form an ink dot Iad prior to the second-type ink droplet Ib. The second-type ink droplet Ib permeates the sheet PM following the permeation of the first-type ink droplet Ia. The ink droplets Ia and Ib that landed on the same pixel area PP1 are in contact with each other. Therefore, the second-type ink droplet Ib may be drawn by the first-type ink droplet Ia permeating prior to the second-type ink droplet Ib and thus may move over the first-type ink droplet Ia.

FIG. 4C illustrates a case in which a first-type ink droplet Ia is ejected onto a second pixel area PP2 and a second-type ink droplet Ib is ejected onto a first pixel area PP1. The pixel areas PP1 and PP2 are adjacent to each other and therefore the ink droplets Ia and Ib may come into contact with each other. In a case that the ink droplets Ia and Ib are in contact with each other, the second-type ink droplet Ib may be drawn by the first-type ink droplet Ia permeating prior to the second-type ink droplet Ib and thus may move over the first-type ink droplet Ia. Therefore, the second-type ink droplet Ib may intrude into the adjacent second pixel area PP2 from the first pixel area PP1 where the second-type ink droplet Ib is intended to be. As described above, protrusion of an ink droplet out of an intended pixel area may lead to ink bleeding.

FIG. 4D illustrates a case in which a first-type ink droplet Iax and a second-type ink droplet Ib are ejected onto the same first pixel area PP1 and a first-type ink droplet Ia is ejected onto a second pixel area PP2. As compared with the case depicted in FIG. 4C, in addition to the second-type ink droplet Ib, another ink droplet (e.g., the first-type ink droplet Iax of the first-type ink) has landed on the same first pixel area PP1. The ink droplets Iax and Ib that landed on the same pixel area PP1 are in contact with each other in a large area. The ink droplets Ib and Ia that landed on the respective different pixel areas PP1 and PP2 may also come into contact with each other. Nevertheless, the contact area between the ink droplets Ib and Ia is smaller than the contact area between the ink droplets Iax and Ib that landed on the same pixel area PP1. Therefore, the second-type ink droplet Ib is drawn strongly by the ink droplet Iax that is in the same pixel area PP1 and has more contact area with the second-type ink droplet Ib than the ink droplet Ia in the adjacent pixel area PP2. Accordingly, such phenomenon may reduce intrusion of the second-type ink droplet Ib into the adjacent pixel area PP2.

As described above, in a case that the ink droplet Ib tends to intrude into the adjacent pixel area PP2 as depicted in FIG. 4C, another ink droplet (e.g., the ink droplet Iax) is ejected onto the same pixel area PP1 where the ink droplet Ib is ejected as depicted in FIG. 4D, thereby reducing intrusion of the ink droplet Ib into the adjacent pixel area PP2. For example, in a case that chromatic color ink (e.g., one of C ink, M ink, and Y ink) is used for the first-type ink droplet Ia and K ink is used for the second-type ink droplet Ib, chromatic color ink is ejected onto an area where K ink is ejected. By doing so, intrusion of K ink into an unintended area caused by drawing of K ink by chromatic color ink in the unintended area (e.g., K ink bleeding) may be reduced.

Hereinbefore, the description has been made on the example cases in which the permeation speed differs between a first-type ink and a second-type ink. Nevertheless, a similar phenomenon may occur also in a case in the permeation speed is the same between a first-type ink and a second-type ink. For example, similar to the case depicted in FIG. 4C, the second-type ink droplet Ib ejected onto the pixel area PP1 may come into contact with the first-type ink droplet Ia ejected onto the adjacent pixel area PP2. The contacting ink droplets Ia and Ib may mix with each other at their contacting portions. Therefore, the second-type ink droplet Ib may intrude into the adjacent pixel area PP2.

It is assumed that, in addition to the second-type ink droplet Ib, another ink droplet (e.g., the first-type ink droplet Iax) is ejected onto the same first pixel area PP1 in the same manner to the example depicted in FIG. 4D. In this case, the second-type ink droplet Ib tends to mix with the first-type ink droplet Iax that is in the same pixel area PP1 and has more contact area with the first-type ink droplet than the first-type ink droplet Ia in the adjacent pixel area PP2. Accordingly, such phenomenon may reduce intrusion of the second-type ink droplet Ib into the adjacent pixel area PP2.

Nevertheless, irrespective of whether or not the permeation speed differs between the first-type ink and the second-type ink, an ink droplet additionally ejected onto the first pixel area PP1 in the same manner to the example depicted in FIG. 4D may be an ink droplet having a different type from the ink droplet Ia ejected onto the adjacent pixel area PP2. In this case, the ink droplet Ib may come into contact with the additional ink droplet ejected onto the same pixel area PP1, whereby intrusion of the ink droplet Ib into the adjacent pixel area PP2 may be reduced.

In the illustrative embodiment, the bleeding reduction processing in step S225 of FIG. 3 is configured in consideration of such phenomenon.

A4. Bleeding Reduction Processing

Figure 5A:
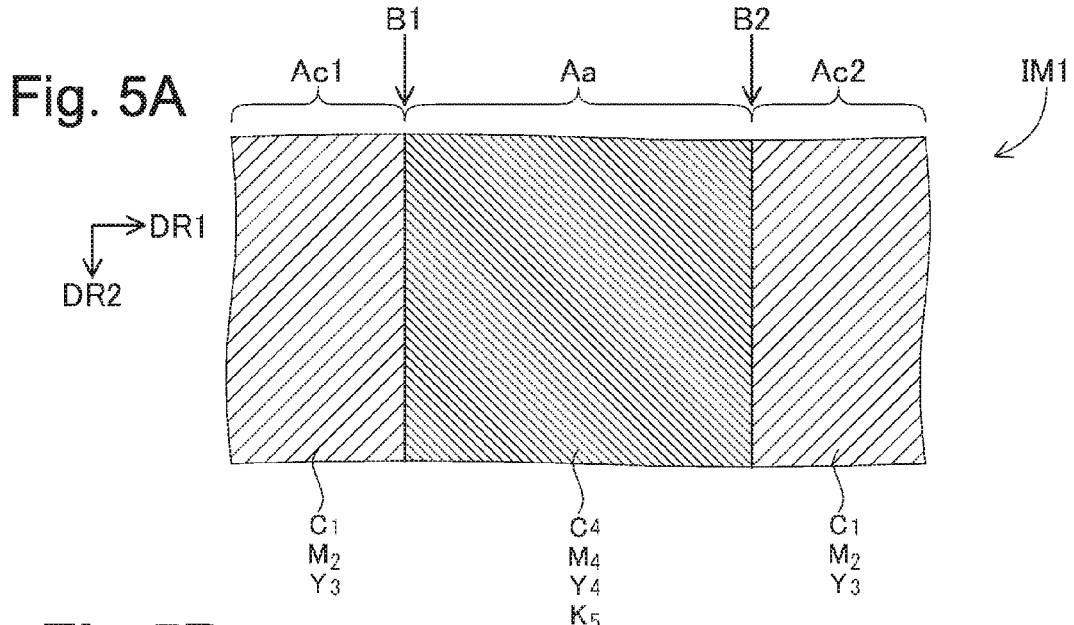
FIGS. 5A, 5B, and 5C are schematic diagrams illustrating example bleeding reduction processing in the illustrative embodiment according to one or more aspects of the disclosure.
Figure 5B:
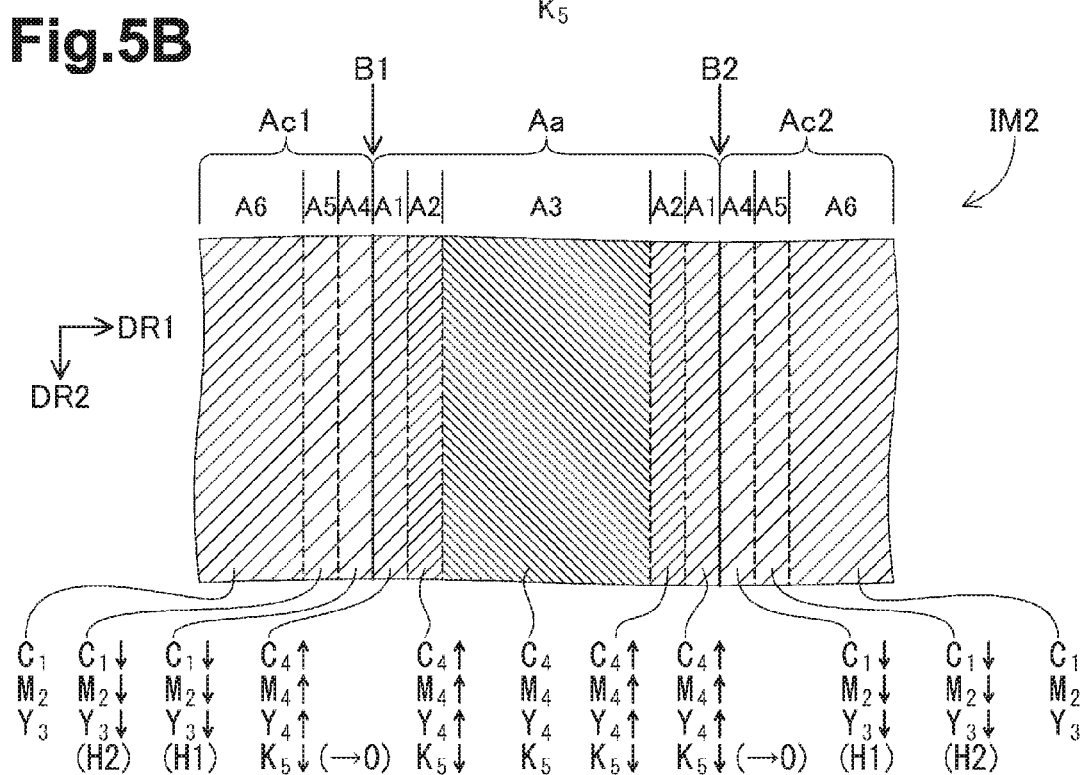
Figure 5C:
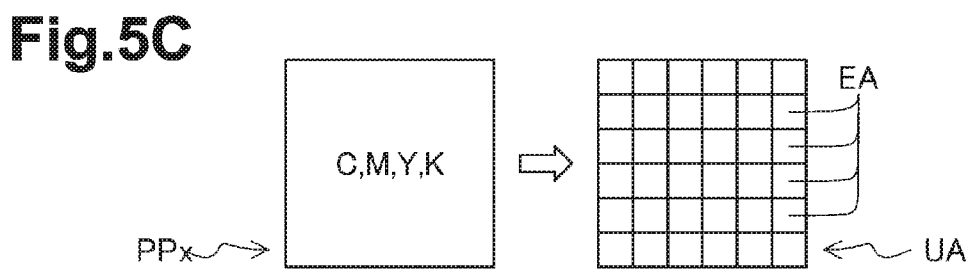

FIGS. 5A, 5B, and 5C are schematic diagrams illustrating the bleeding reduction processing. FIG. 5A illustrates a portion of an image on which the bleeding reduction processing in step S225 of FIG. 3 has not been executed (hereinafter, referred to as an "unprocessed image IM1"). FIG. 5B illustrates a partial image acquired by execution of the bleeding reduction processing on the unprocessed image IM1 (hereinafter, referred to as a "processed image IM2"). Print pixels representing each of the images IM1 and IM2 are arranged in matrix along a first direction DR1 and a second direction DR2 orthogonal to each other.

The unprocessed image IM1 includes an achromatic-color representation area Aa, a first chromatic-color representation area Ac1, and a second chromatic-color representation area Ac2. The first chromatic-color representation area Ac1 is located to the left of the achromatic-color representation area Aa (e.g., a direction opposite to the direction in which the first direction DR1 points). The second chromatic-color representation area Ac2 is located to the right of the achromatic-color representation area Aa (e.g., a direction the same as the direction in which the first direction DR1 points). The achromatic-color representation area Aa may be a solid colored area representing achromatic color. Each of the chromatic-color representation areas Ac1 and Ac2 may be a solid colored area representing chromatic color. A first boundary line B1 extending parallel to the second direction DR2 may be a border between the achromatic-color representation area Aa and the first chromatic-color representation area Ac1. A second boundary line B2 extending parallel to the second direction DR2 may be a border between the achromatic-color representation area Aa and the second chromatic-color representation area Ac2.

In FIG. 5A, a combination symbol is indicated below each of the representations areas Aa, Ac1, and Ac2. Each combination symbol indicates a combination of one or more of cyan C, magenta M, yellow Y, and black K, each of which has a tone value greater than 0 (zero). The achromatic-color representation area Aa is represented by at least K (i.e., by only K or by all of four colors of C, M, Y, and K). In the achromatic-color representation area Aa, the C, M, Y, and K tone values may be, for example, C4, M4, Y4, and K5, respectively (i.e., the C, M, and Y have the same tone value). The chromatic-color representation areas Ac1 and Ac2 are each represented by at least one of C, M, and Y. In each of the chromatic-color representation areas Ac1 and Ac2, the C, M, and Y tone values may be, for example, C1, M2, and Y3, respectively (i.e., the C, M, and Y may have respective different tone values and the K tone value is 0 (zero)). A type of ink to be ejected onto one or more ejection areas associated with each print pixel is determined in the halftone processing in step S230 of FIG. 3. FIG. 5C is an explanatory diagram illustrating a relationship between a print pixel PPx, a print unit area UA, and ejection areas EA. As depicted in FIG. 5C, the print unit area UA onto which ink is to be ejected based on a single print pixel PPx (i.e., a single unit for which a single combination of one or more of C, M, Y, and K is specified for image data) may consist of a plurality of ejection areas EA. For example, in the achromatic-color representation area Aa, C ink dots, M ink dots, Y ink dots, and K ink dots may be scattered at random over the ejection areas. That is, among the ejection areas associated with the single print pixel, there may be one or more ejection areas on which not all of C ink dot, M ink dot, Y ink dot, and K ink dot have landed (e.g., only K ink dot lands). Likewise, in each of the chromatic-color representation areas Ac1 and Ac2, C ink dots, M ink dots, and Y ink dots may be scattered at random over the ejection areas. That is, among the ejection areas associated with the single print pixel, there may be one or more ejection areas on which not all of C ink dot, M ink dot, and Y ink dot have landed (e.g., only C ink dot land). In each case of C, M, Y, and K, a larger tone value provides a higher ink dot density. That is, the tone value may represent an ink amount per unit area. In the illustrative embodiment, as depicted in FIG. 5C, thirty-six (36) ejection areas are associated with a single print pixel PPx. Nevertheless, in other embodiments, for example, the number of ejection areas EA associated with a single print pixel PPx may be one or plural, generally any number of 1 (one) or larger.

In a case that, in the achromatic-color representation area Aa, black K ink is ejected onto a print unit area UA of each print pixel adjacent to one of the chromatic-color representation areas Ac1 and Ac2, as described in the example depicted in FIG. 4C, black K ink may intrude into an adjacent one of the chromatic-color representation areas Ac1 and Ac2 beyond a corresponding one of the boundary lines B1 and B2. The color of black K ink is recognized as being darker than the colors of the other color inks. Therefore, intrusion of black K ink may be recognized as ink bleeding.

In FIG. 5B, the processed image IM2 includes partial areas A1, A2, A3, A4, A5, and A6. In FIG. 5B, subscripts are described to each code. A1 includes $A1_1$ and $A1_2$ (hereafter, the subscript of 1 corresponds to the left side and the subscript of 2 corresponds to the right side). The same relationship is applied for A2 ($A2_1$ and $A2_2$), A4 ($A4_1$ and $A4_2$), A5 ($A5_1$ and $A5_2$), and A6 ($A6_1$ and $A6_2$). Though the explanation described below is only corresponding to the left side, it is the same for the right side.

1) The first partial area $A1_1$ may be defined as a partial area that is included in the achromatic-color representation area Aa and is adjacent to a chromatic-color representation area Ac1.

2) The second partial area $A2_1$ may be defined as a partial area that is included in the achromatic-color representation area Aa, and is remote from the chromatic-color representation area Ac1 and adjacent to the first partial area $A1_1$. As used herein, the term "remote" means that a first area is separate from a second area with at least a third area being between the first area and the second area. For example, $A2_1$ is remote from $A4_1$ with $A1_1$ being between $A2_1$ and $A4_1$.

3) The third partial area A3 may be defined as a partial area that is included in the achromatic-color representation area Aa, and is remote from the chromatic-color representation area Ac1 and the first partial area $A1_1$, and adjacent to the second partial area $A2_1$.

4) The fourth partial area $A4_1$ may be defined as a partial area that is included in the chromatic-color representation area Ac1, and is adjacent to the achromatic-color representation area Aa.

5) The fifth partial area $A5_1$ may be defined as a partial area that is included in the chromatic-color representation area Ac1, and is remote from the achromatic-color representation area Aa, and adjacent to the fourth partial area $A4_1$.

6) The sixth partial area $A6_1$ may be defined as a partial area that is included in the chromatic-color representation area Ac1 and is remote from the achromatic-color representation area Aa and the fourth partial area $A4_1$, and adjacent to the fifth partial area $A5_1$.

FIG. 5B illustrates a change in tone value of each of cyan C, magenta M, yellow Y, and black K indicated below each of the representations areas Aa, Ac1, and Ac2. More specifically, an arrow is appended to the right of a symbol representing color of ink. The arrow indicates a tone value change in color of each ink by the bleeding reduction processing. An up arrow indicates increase in a tone value. A down arrow indicates decrease in a tone value. No arrow indicates no change in a tone value.

Figure 6:
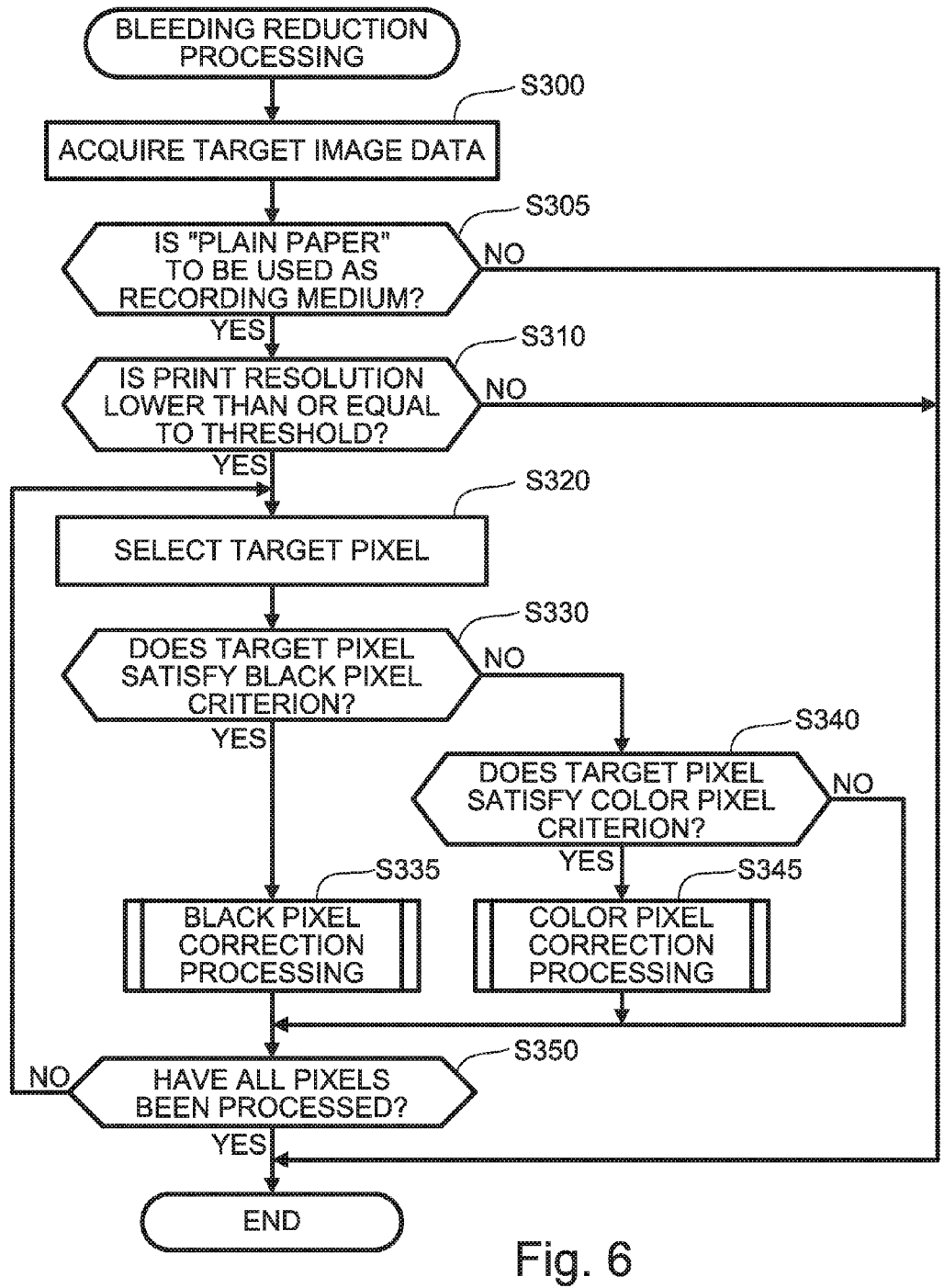
FIG. 6 is a flowchart depicting the bleeding reduction processing in the illustrative embodiment according to one or more aspects of the disclosure.

FIG. 6 is a flowchart depicting the bleeding reduction processing. In step S300, the processor 110 acquires image data to be processed in the bleeding reduction processing (hereinafter, also referred to as "target image data"). In the illustrative embodiment, the processor 110 stores the image data processed in step S220 of FIG. 3 in the storage device (e.g., one of the volatile storage device 120 and the non-volatile storage device 130) temporarily. In step S300, the processor 110 acquires the target image data from the storage device. In step S305, the processor 110 determines whether "plain paper" is to be used as a recording medium. Ink is less likely to bleed on "glossy paper" or "matte paper" as compared with "plain paper". Therefore, when "plain paper" is not to be used as a recording medium (e.g., when "glossy paper" or "matte paper" is to be used as a recording medium) (e.g., NO in step S305), the processor 110 ends the bleeding reduction processing of FIG. 6 without executing subsequent steps.

When "plain paper" is to be used as a recording medium (e.g., YES in step S305), in step S310, the processor 110 determines whether the printing pixel density (hereinafter, also referred to as "print resolution") is lower than or equal to a predetermined threshold. In the illustrative embodiment, the predetermined threshold may be equal to the low pixel density associated with the print quality of "Fast". When the printing pixel density is equal to the high pixel density associated with the print quality of "Fine", the processor 110 makes a negative determination (e.g., "NO") in step S310. When the printing pixel density is equal to the low pixel density associated with the print quality of "Fast", the processor 110 makes a positive determination (e.g., "YES") in step S310. In a case that the pixel density is high, each ink droplet has a size smaller than the size of each ink droplet when the pixel density is low. Therefore, ink bleeding may be unobtrusive. Therefore, in the illustrative embodiment, when the pixel density is equal to the high pixel density (e.g., NO in step S310), the processor 110 ends the bleeding reduction processing of FIG. 6 without executing subsequent steps.

When the printing pixel density is equal to the low pixel density (e.g., YES in step S310), in step S320, the processor 110 selects an unprocessed pixel from the print pixels as a target pixel. In step S330, the processor 110 determines whether the target pixel satisfies a predetermined black pixel criterion. The black pixel criterion is used for determining whether an amount of achromatic color ink (e.g., black K ink) represented by a pixel value is relatively large. In the illustrative embodiment, the black pixel criterion may be that the tone value of achromatic color ink (e.g., the black K tone value) should be a predetermined black threshold Kth (e.g., 64) or greater. It is assumed that each of the pixels included in the achromatic-color representation area Aa of FIG. 5A satisfies the black pixel criterion. When the target pixel satisfies the black pixel criterion (e.g., YES in step S330), in step S335, the processor 110 executes black pixel correction processing on a target pixel having a relatively large black K tone value. Subsequent to step S335, the routine proceeds to step S350.

When the target pixel does not satisfy the black pixel criterion (e.g., NO in step S330), in step S340, the processor 110 determines whether the target pixel satisfies a color pixel criterion. The color pixel criterion is used for determining whether the target pixel represents chromatic color. In the illustrative embodiment, the color pixel criterion may be that a total of the tone values of chromatic color inks (e.g., a sum of the tone values of C, M, and Y) should be greater than a predetermined sum threshold (e.g., 128) which is greater than zero. When a negative determination (e.g., "NO") is made in step S330 (i.e., the black K tone value is smaller than the predetermined threshold) and the total of tone values of chromatic color inks is greater than the predetermined sum threshold, the target pixel may represent chromatic color in many cases. It is assumed that each of the pixels included in each of the chromatic-color representation areas Ac1 and Ac2 of FIG. 5A satisfies the color pixel criterion. When the target pixel satisfies the color pixel criterion (e.g., YES in step S340), in step S345, the processor 110 executes color pixel correction processing on a target pixel representing chromatic color. Subsequent to step S345, the routine proceeds to step S350.

In step S350, the processor 110 determines whether all of the print pixels have been processed. When one or more unprocessed pixels remain (e.g., NO in step S350), the routine proceeds to step S320. When all of the pixels have been processed (e.g., YES in step S350), the processor 110 ends the bleeding reduction processing of FIG. 6.

Figure 7A:
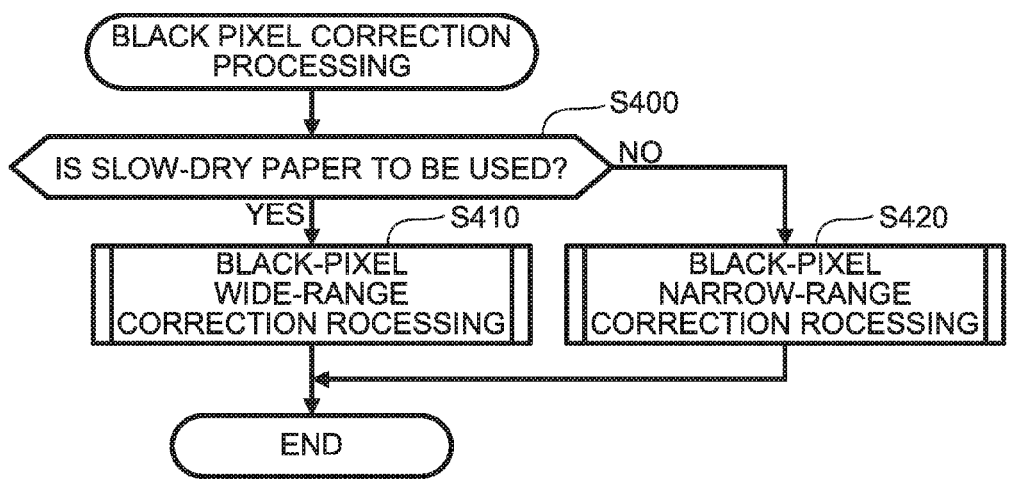

A4-1. Black Pixel Correction Processing when "Quick-Dry Paper" is Used as Recording Medium FIG. 7A is a flowchart depicting the black pixel correction processing. In step S400, the processor 110 determines whether "slow-dry paper" is to be used as a recording medium. When "quick-dry paper" is to be used as a recording medium (e.g., NO in step S400), in step S420, the processor 110 executes black-pixel narrow-range correction processing and then ends the black pixel correction processing of FIG. 7A. When "slow-dry paper" is to be used as a recording medium (e.g., YES in step S400), in step S410, the processor 110 executes black-pixel wide-range correction processing and then ends the black pixel correction processing of FIG. 7A. Hereinafter, a description will be made on the case in which "quick-dry paper" is to be used as a recording medium (e.g., NO in step S400).

Figure 7B:
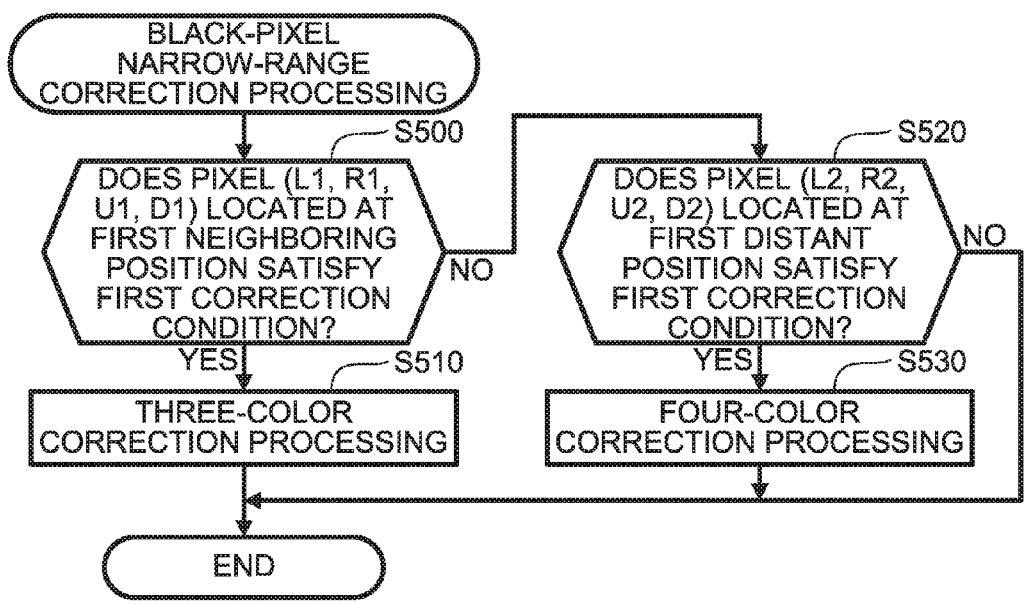

FIG. 7B is a flowchart depicting the black-pixel narrow-range correction processing in step S420 of FIG. 7A. In step S500, the processor 110 determines whether a pixel located at a predetermined first neighboring position with respect to the target pixel CT satisfies a first correction condition. The first neighboring position specifies a range of searching a pixel that satisfies the first correction condition.

Figure 8:
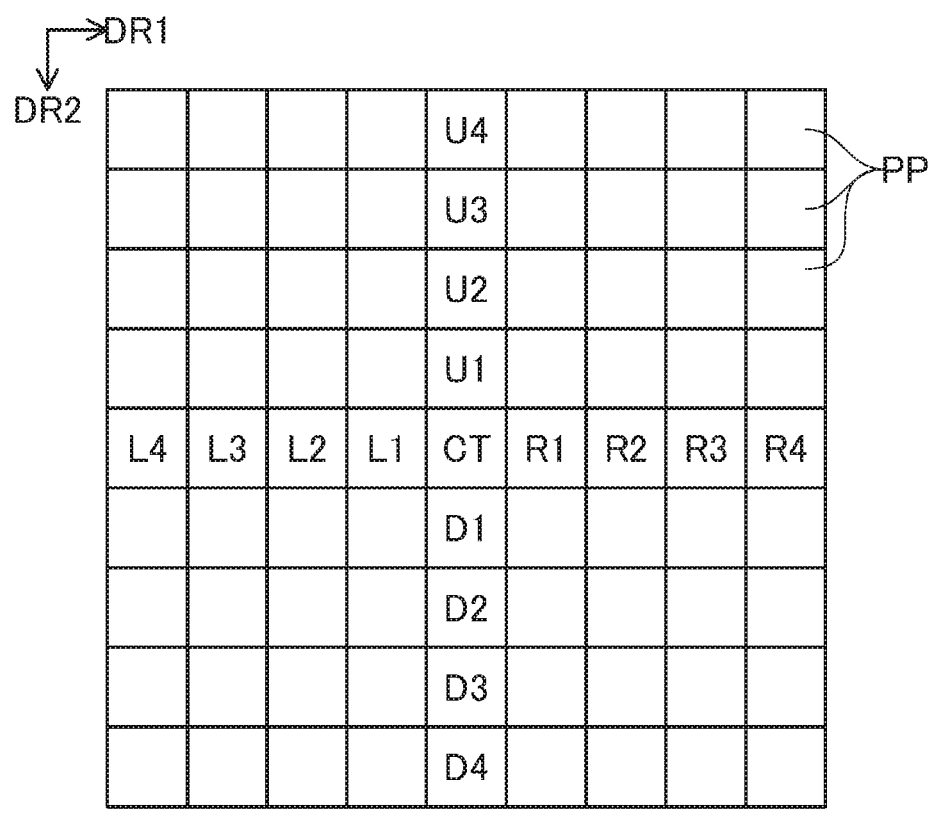
FIG. 8 is an explanatory diagram illustrating a pixel position with respect to a target pixel in the illustrative embodiment according to one or more aspects of the disclosure.

FIG. 8 is an explanatory diagram illustrating a pixel position with respect to the target pixel CT. A rectangle PP represents a print pixel. Pixels R1, R2, R3, and R4 represent pixels located to the right of the target pixel CT (e.g., the direction is the same as the direction in which the first direction DR1 points). Pixels L, L2, L3, and L4 represent pixels located to the left of the target pixel CT (e.g., the direction opposite to the direction in which the first direction DR1 points). Pixels D1, D2, D3, and D4 represent pixels located below the target pixel CT (e.g., a direction the same as the direction in which the second direction DR2 points). Pixels U1, U2, U3, and U4 represent pixels located above the target pixel CT (e.g., a direction opposite to the direction in which the second direction DR2 points). A value appended to a symbol representing color of ink represents a distance from the target pixel CT to the pixel with the symbol (the unit may be the number of pixels).

In FIG. 8, the pixel that is located at the first neighboring position and is targeted for determination in step S500 of FIG. 7B includes the pixels L, R1, U1, and D1. That is, the range of searching a pixel that satisfies the first correction condition may be a range of one pixel including the first pixel from the target pixel CT in the up, down, right, and left directions. When it is determined whether a candidate pixel selected from the pixels located at the first neighboring position satisfies the first correction condition, the first correction condition may be that "a total of the C, M, and Y tone values of the candidate pixel should be greater than a predetermined total threshold which is greater than zero" and "a difference between the black K tone value of the candidate pixel and the black K tone value of the target pixel CT should be greater than a predetermined difference threshold (e.g., 128)". The total threshold may be equal to the total threshold used in step S340 of FIG. 6. The pixel that satisfies the first correction condition may be, for example, adjacent to the target pixel CT representing black and represent chromatic color.

Except a condition on recording medium and a condition on print resolution, when a condition that "a positive determination (e.g., "YES") is made in step S330 of FIG. 6" and "a positive determination (e.g., "YES") is made in step S500 of FIG. 7B" is satisfied, the processor 110 executes three-color correction processing in step S510 of FIG. 7B. For example, in a case that the target pixel CT is included in the achromatic-color representation area Aa of FIG. 5A and is adjacent to one of the first chromatic-color representation area Ac1 and the second chromatic-color representation area Ac2, the target pixel CT satisfies the condition given in step S330 of FIG. 6 and a pixel that is included in the chromatic-color representation area (e.g., one of the chromatic-color representation areas Ac1 and Ac2) and is adjacent to the target pixel CT satisfies the condition given in step S500 of FIG. 7B.

FIGS. 9A and 9B are explanatory diagrams illustrating the three-color correction processing. Tone values Ci, Mi, Yi, and Ki in the left graph of each of FIGS. 9A and 9B indicate C, M, Y, and K tone values, respectively, of the target pixel CT before correction (hereinafter, also referred to as "uncorrected values"). Tone values Cc, Mc, Yc, and Kc in the right graph of each of FIGS. 9A and 9B indicate C, M, Y, and K tone values, respectively, of the target pixel CT after correction (hereinafter, also referred to as "corrected values"). A first value Di1 may be equal to the uncorrected black K tone value Ki. A second value Di2 may be a value obtained by subtraction of the maximum tone value among the uncorrected tone values of chromatic color inks (e.g., among the uncorrected C, M, and Y tone values Ci, Mi, and Yi) from the maximum tone value (e.g., 255) of an available tone value range.

FIG. 9A illustrates a case in which the first value Di1 is smaller than or equal to the second value Di2 (Di1≤Di2). The processor 110 reduces the black K tone value to zero (i.e., Kc=0). The processor 110 adds the first value Di1 to each of the uncorrected tone values of the chromatic color inks and specifies the obtained value for each of the tone values of the chromatic color inks (e.g., the corrected tone values Cc, Mc, and Yc).

FIG. 9B illustrates a case in which the first value Di1 is greater than the second value Di2 (Di1>Di2). In this case, also, the processor 110 reduces the black K tone value to zero (i.e., Kc=0). If, however, the first value Di1 is simply added to each of the uncorrected tone values of the chromatic color inks, the corrected tone values of the chromatic color inks (e.g., the corrected tone values Cc, Mc, and Yc) may exceed the maximum value of 255. Therefore, in the illustrative embodiment, the processor 110 adds the second value Di2 to each of the uncorrected tone values of the chromatic color inks and specifies the obtained value for each of the tone values of the chromatic color inks (e.g., the corrected tone values Cc, Mc, and Yc).

In response to completion of the specification of the corrected tone values (e.g., the corrected tone values Cc, Mc, Yc, and Kc) of all color components of the target pixel CT, the processor 110 ends step S510 of FIG. 7B, i.e., the black-pixel narrow-range correction processing of FIG. 7B.

In FIG. 5B, assuming that the first partial area A1 has a width of one pixel in the first direction DR1 (i.e., the first partial area A1 consists of pixels adjacent to one of the first chromatic-color representation area Ac1 and the second chromatic-color representation area Ac2), the tone values of each of the print pixels included in the first partial area A1 may be corrected in the three-color correction processing in step S510 of FIG. 7B. Therefore, as described in the example depicted in FIGS. 9A and 9B, in the first partial area A1, the amount of black K is reduced to zero and the amount of each of C, M, and Y is increased. As described above, in the illustrative embodiment, achromatic color is represented by mixture of equal amounts of C, M, and Y. In the three-color correction processing of FIGS. 9A and 9B, the increased amount is equal to each other among C, M, and Y. Therefore, the color of the first partial area A1 which has achromatic color before correction remains achromatic color after correction.

When a negative determination (e.g., "NO") is made in step S500 of FIG. 7B, in step S520, the processor 110 determines whether a pixel located at a predetermined first distant position with respect to the target pixel CT satisfies the first correction condition. In FIG. 8, the pixel that is located at the first distant position includes the pixels L2, R2, U2, and D2. Each of the pixels L2, R2, U2, and D2 is the second pixel from the target pixel CT, that is, each of the pixels L2, R2, U2, and D2 is distant from the target pixel CT while one pixel is situated therebetween. As described above, the first distant position refers to a pixel position that is farther from the target pixel CT than the first neighboring position and is adjacent to the first neighboring position. The first correction condition may be the same as the first correction condition used in step S500.

Except the condition on recording medium and the condition on print resolution, when a condition that "a positive determination (e.g., "YES") should be made in step S330 of FIG. 6" and "a negative determination (e.g., "NO") should be made in step S500 of FIG. 7B" is satisfied, the processor 110 executes four-color correction processing in step S530 of FIG. 7B. It is assumed that, in FIG. 5B, the first partial area A1 has a width of one pixel in the first direction DR1 and the second partial area A2 has a width of one pixel in the first direction DR1 (i.e., the second partial area A2 consists of pixels adjacent to the first partial area A1). In this case, when the target pixel CT is one of the pixels included in the second partial area A2, the target pixel CT satisfies the condition given in step S330 of FIG. 6 and a pixel that is included in the chromatic-color representation area (e.g., one of the chromatic-color representation areas Ac1 and Ac2) and is the second pixel from the target pixel CT satisfies the condition given in step S520 of FIG. 7B.

Figure 10A:
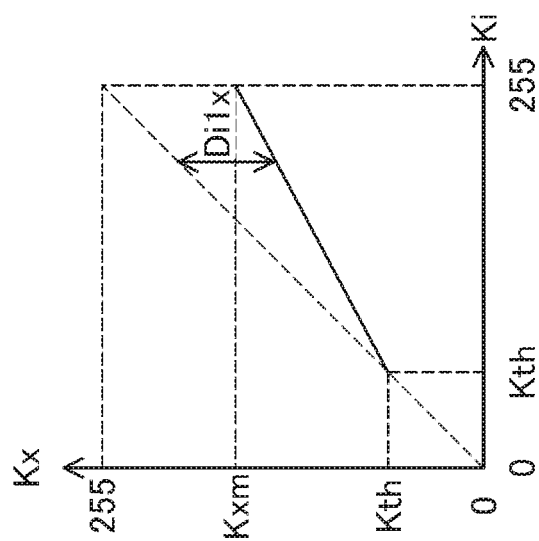

FIGS. 10A, 10B, and 10C are explanatory diagrams illustrating the four-color correction processing. FIG. 10A depicts a graph showing an example correspondence between an uncorrected black K tone value Ki and a reference value Kx for a corrected black K tone value. A black threshold Kth may be equal to the black threshold Kth used in step S330 of FIG. 6. In the illustrative embodiment, the reference value Kx is in direct proportion to the tone value Ki. When the tone value Ki is equal to the black threshold Kth, the reference value Kx is also equal to the black threshold Kth. A proportionality constant may be greater than 0 (zero) and smaller than 1 (one). That is, where the tone value Ki is equal to the black threshold Kth or greater, 0<reference value Kx<tone value Ki. The first value Di1$x$ is a value obtained by subtraction of the tone value Ki from the reference value Kx.

FIGS. 10B and 10C each illustrate the uncorrected C, M, Y, and K tone values Ci, Mi, Yi, and Ki of the target pixel CT in the left graph and the corrected C, M, Y, and K tone values Cc, Mc, Yc, and Kc of the target pixel CT in the right graph. The second value Di2 may be the same as the second value Di2 used in FIG. 9. A weighting factor Wn may be defined by the C, M, and Y tone values Cn, Mn, and Yn of a pixel that is determined as satisfying the first correction condition in step S520 of FIG. 7B. For example, in the illustrative embodiment, Wn=(Mn+Yn/2+Cn/4)/255. When a value obtained by (Mn+Yn/2+Cn/4)/255 is greater than 1 (one), the weighting factor Wn is determined as 1 (one). The weighted first value Di1$w$ may be obtained by multiplication of the first value Di1$x$ by the weighting factor Wn. The weighted second value Di2$w$ may be obtained by multiplication of the second value Di2 by the weighting factor Wn.

FIG. 10B illustrates a case in which the first value Di1$x$ is smaller than or equal to the second value Di2 (Di1$x$≤Di2). The processor 110 specifies a value obtained by subtraction of the weighted first value Di1$w$ from the uncorrected tone value Ki for the black K tone value. As described above, the weighting factor Wn may be 1 or smaller, and the maximum value of the weighted first value Di1$w$ may be equal to the first value Di1$x$. As depicted in FIG. 10A, the reference value Kx, which may be obtained by a subtraction of the first value Di1$x$ from the uncorrected tone value Ki, may be greater than zero. Therefore, the corrected tone value Kc may be greater than zero. The processor 110 specifies a value obtained by addition of the weighted first value Di1$w$ to each of the uncorrected tone values of a the chromatic color inks for each of the tone values of the chromatic color inks (e.g., the corrected tone values Cc, Mc, and Yc).

FIG. 10C illustrates a case in which the first value Di1$x$ is greater than the second value Di2 (Di1$x$>Di2). In this case, also, the processor 110 specifies a value obtained by subtraction of the weighted first value Di1$w$ from the uncorrected tone value Ki for the black K tone value. If, however, the weighted first value Di1$w$ is simply added to each of the uncorrected tone values of the chromatic color inks, the corrected tone values of the chromatic color inks (e.g., the corrected tone values Cc, Mc, and Yc) may exceed the maximum value of 255. Therefore, in the illustrative embodiment, the processor 110 adds the weighted second value Di2$w$ to each of the uncorrected tone values of the chromatic color inks and specified the obtained value for each of the tone values of the chromatic color inks (e.g., the corrected tone values Cc, Mc, and Yc).

In response to completion of the specification of the corrected tone values (e.g., the corrected tone values Cc, Mc, Yc, and Kc) of all color components of the target pixel CT, the processor 110 ends step S530 of FIG. 7B, i.e., the black-pixel narrow-range correction processing of FIG. 7B.

In FIG. 5B, assuming that the first partial area A1 has a width of one pixel in the first direction DR1 and the second partial area A2 has a width of one pixel in the first direction DR1, the tone values of each of the print pixels included in the second partial area A2 may be corrected in the four-color correction processing in step S530 of FIG. 7B. Therefore, as described in the example depicted in FIGS. 10A, 10B and 10C, in the second partial area A2, the amount of black K is reduced and the amount of each of C, M, and Y is increased. In the four-color correction processing of FIGS. 10B and 10C, the increased amount is equal to each other among C, M, and Y. Therefore, the color of the second partial area A2 which has achromatic color before correction remains achromatic color after correction. The corrected black K tone value Kc may be greater than zero.

When a negative determination (e.g., "NO") is made in step S520 of FIG. 7B, the processor 110 ends the black-pixel narrow-range correction processing of FIG. 7B, i.e., the black pixel correction processing of FIG. 7A, without executing the correction processing on the target pixel CT. For example, when the target pixel CT is one of the print pixels included in the third partial area A3 of FIG. 5B, a negative determination (e.g., "NO") is made in each of steps S500 and S520 of FIG. 7B. Therefore, the processor 110 does not execute correction processing and thus does not change the tone values of each of the print pixels included in the third partial area A3.

A4-2. Black Pixel Correction Processing when "Slow-Dry Paper" is Used as Recording Medium FIG. 7C is a flowchart depicting the black-pixel wide-range correction processing in step S410 of FIG. 7A. Step S500a may be similar to step S500 of FIG. 7B. Instead of the first neighboring position, in step S500, a second neighboring position is used in the determination. In FIG. 8, the pixel that is located at the second neighboring position include eight pixels, for example, the pixels L, L2, R1, R2, U1, U2, D1, and D2. The range of searching a pixel that satisfies the first correction condition may be a range of two pixels including the first and second pixels from the target pixel CT, which may be wider than the searching range used in step S500 of FIG. 7B.

Except the condition on recording medium and the condition on print resolution, when a condition that "a positive determination (e.g., "YES") should be made in step S330 of FIG. 6" and "a positive determination (e.g., "YES") should be made in step S500a of FIG. 7C" is satisfied, the processor 110 executes the three-color correction processing in step S510 of FIG. 7C. The three-color correction processing executed in step S510 of FIG. 7C may be the same as the three-color correction processing executed in step S510 of FIG. 7B and illustrated in FIGS. 9A and 9B. For example, in FIG. 5B, assuming that the first partial area A1 has a width of two pixels in the first direction DR1 (i.e., the first partial area A1 consists of pixels located in the range of two pixels from one of the first chromatic-color representation area Ac1 and the second chromatic-color representation area Ac2), the tone values of each of the print pixels included in the first partial area A1 are corrected in the three-color correction processing in step S510 of FIG. 7C. Therefore, as described in the example of FIGS. 9A and 9B, in the first partial area A1, the amount of black K is reduced to zero and the amount of each of C, M, and Y is increased. The color of the first partial area A1 which has achromatic color before correction remains achromatic color after correction.

When a negative determination (e.g., "NO") is made in step S500a of FIG. 7C, the routine proceeds to step S520a. Step S520a may be similar to step S520 of FIG. 7B. Instead of the first distant position, in step S520a, a second distant position is used in the determination. In FIG. 8, the pixel located at the second distant position include eight pixels, for example, the pixels L3, L4, R3, R4, U3, U4, D3, and D4. The range of searching a pixel that satisfies the first correction condition may be a range of two pixels including the third and fourth pixels from the target pixel CT. The second distant position refers to a pixel position that is farther from the target pixel CT than the second neighboring position and is adjacent to the second neighboring position.

Except the condition on recording medium and the condition on print resolution, when a condition that "a positive determination (e.g., "YES") should be made in step S330 of FIG. 6", "a negative determination (e.g., "NO") should be made in step S500a of FIG. 7C" and "a positive determination (e.g., "YES") should be made in step S520a of FIG. 7C" is satisfied, the processor 110 executes the four-color correction processing in step S530 of FIG. 7C. The four-color correction processing executed in step S530 of FIG. 7C may be the same as the four-color correction processing executed in step S530 of FIG. 7B and illustrated in FIGS. 10B and 10C. For example, in FIG. 5B, assuming that the first partial area A1 has a width of two pixels in the first direction DR1 and the second partial area A2 has a width of two pixels in the first direction DR1, the tone values of each of the print pixels included in the second partial area A2 are corrected in the four-color correction processing in step S530 of FIG. 7C. Therefore, as described in the example of FIGS. 10B and 10C, in the second partial area A2, the amount of black K is reduced and the amount of each of C, M, and Y is increased. The color of the second partial area A2 which has achromatic color before correction remains achromatic color after correction. The corrected black K tone value Kc may be greater than zero.

When a negative determination (e.g., "NO") is made in step S520a of FIG. 7C, the processor 110 ends the black-pixel wide-range correction processing of FIG. 7C, i.e., the black pixel correction processing of FIG. 7A without executing the correction processing on the target pixel CT. For example, when the target pixel CT is one of the print pixels included in the third partial area A3 of FIG. 5B, a negative determination (e.g., "NO") is made in each of steps step S500a and S520a of FIG. 7C. Therefore, the processor 110 does not execute correction processing and thus does not change the tone values of each of the print pixels included in the third partial area A3.

A4-3. Color Pixel Correction Processing

Figure 11:
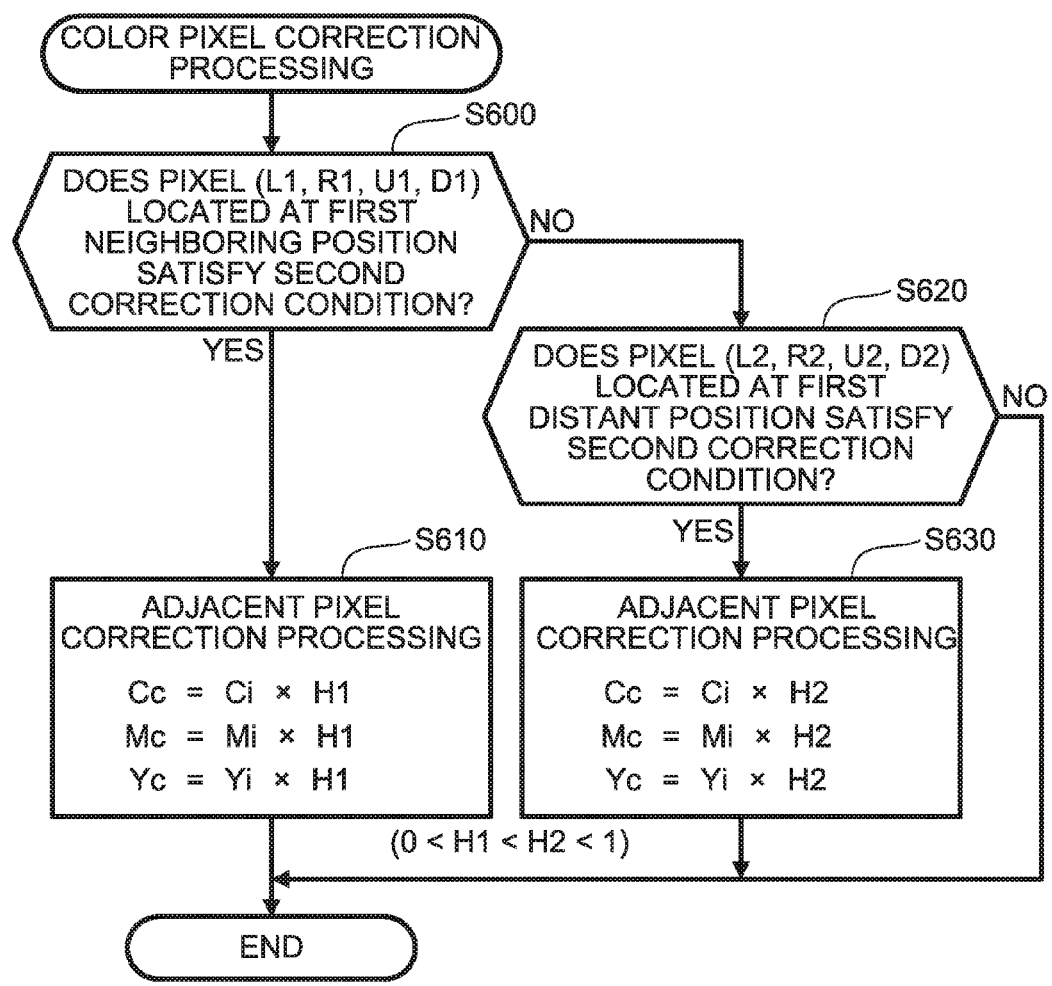
FIG. 11 is a flowchart depicting example color pixel correction processing in the illustrative embodiment according to one or more aspects of the disclosure.

FIG. 11 is a flowchart depicting the color pixel correction processing in step S345 of FIG. 6. In step S600, the processor 110 determines whether a pixel located at a predetermined first neighboring position with respect to the target pixel CT satisfies a second correction condition. The first neighboring position may be defined as the same as the first neighboring position of FIG. 7B. In a case that the processor 110 determines whether a candidate pixel selected from the pixels located at the first neighboring position satisfies the second correction condition, the second correction condition may be that "the candidate pixel should satisfy the black pixel criterion" and "an absolute value that is a difference between a black K tone value of the candidate pixel and the black K tone value of the target pixel CT should be greater than a predetermined difference threshold which is greater than zero". The black pixel criterion may be the same as the black pixel criterion used in step S330 of FIG. 6. The difference threshold may be the same as the difference threshold of the first correction condition used in the example of FIGS. 7B and 7C. The pixel that satisfies the second correction condition may be, for example, adjacent to the target pixel CT representing chromatic color and represent black. When a positive determination ("YES") is made in step S600, the processor 110 executes adjacent pixel correction processing in step S610.

Except the condition on recording medium and the condition on print resolution, when a condition that "a negative determination (e.g., "NO") should be made in step S330 of FIG. 6", "a positive determination (e.g., "YES") should be made in step S340 of FIG. 6", and "a positive determination (e.g., "YES") should be made in step S600 of FIG. 11" is satisfied, the processor 110 executes the adjacent pixel correction processing in step S610. For example, it is assumed that, in FIG. 5B, the fourth partial area A4 has a width of one pixel in the first direction DR1 (i.e., the fourth partial area A4 consists of pixels adjacent to the achromatic-color representation area Aa). When the target pixel CT is one of the pixels included in the fourth partial area A4, the target pixel CT satisfies the condition given in step S340 of FIG. 6 but not satisfy the condition given in step S330 of FIG. 6 and a pixel adjacent to the target pixel CT of the achromatic-color representation area Aa satisfies the condition given in step S600 of FIG. 11.

In the illustrative embodiment, in the adjacent pixel correction processing of step S610, the processor 110 calculates each of the corrected C, M, and Y tone values Cc, Mc, and Yc by multiplying a corresponding one of the uncorrected C, M, and Y tone values Ci, Mi, and Yi of the target pixel CT by a first coefficient H1. The first coefficient H1 may be a predetermined value (e.g., 0.8) greater than 0 and smaller than 1. The corrected black K tone value Kc may be assigned with the same value as the uncorrected tone value Ki. In response to completion of the specification of the corrected tone values (e.g., the corrected tone values Cc, Mc, Yc, and Kc) of all of the color components of the target pixel CT, the processor 110 ends the adjacent pixel correction processing of step S610 in FIG. 11, i.e., the color pixel correction processing of FIG. 11.

As described above, the tone values of each of the print pixels included in the fourth partial area A4 depicted in FIG. 5B may be corrected by the adjacent pixel correction processing in step S610 of FIG. 11. Therefore, in the fourth partial area A4, the amount of each of C, M, and Y is reduced. In the adjacent pixel correction processing, the same first coefficient H1 may be used in correction of each of C, M, and Y. Therefore, the color of the fourth partial area A4 which has chromatic color before correction remains chromatic color after correction.

When a negative determination (e.g., "NO") is made in step S600 of FIG. 11, in step S620, the processor 110 determines whether a pixel located at the first distant position with respect to the target pixel CT satisfies the second correction condition. The first distant position may be defined as the same as the first distant position of FIG. 7B. The second correction condition may be defined as the same as the second correction condition of step S610. When a positive determination (e.g., "YES") is made in step S620, the processor 110 executes distant pixel correction processing in step S630.

Except the condition on recording medium and the condition on print resolution, when a condition that "a negative determination (e.g., "NO") should be made in step S330 of FIG. 6", "a positive determination (e.g., "YES") should be made in step S340 of FIG. 6", "a negative determination (e.g., "NO") should be made in step S600 of FIG. 11", and "a positive determination (e.g., "YES") should be made in step S620 of FIG. 11" is satisfied, the processor 110 executes the distant pixel correction processing in step S630. For example, it is assumed that, in FIG. 5B, the fourth partial area A4 has a width of one pixel in the first direction DR1 and the fifth partial area A5 has a width of one pixel in the first direction DR1 (i.e., the fifth partial area A5 consists of pixels adjacent to the fourth partial area A4). When the target pixel CT is one of the pixels included in the fifth partial area A5, the target pixel CT satisfies the condition given in step S340 of FIG. 6 but not satisfy the condition given in step S330 of FIG. 6 and a pixel that is included in the achromatic-color representation area Aa and is distant from the target pixel CT while one pixel is situated therebetween satisfies the condition given in step S620 of FIG. 11.

In the illustrative embodiment, in the distant pixel correction processing of step S630, the processor 110 calculates each of the corrected C, M, and Y tone value Cc, Mc, and Yc by multiplying a corresponding one of the uncorrected C, M, and Y tone values Ci, Mi, and Yi of the target pixel CT by a second coefficient H2. The second coefficient H2 may be a predetermined value (e.g., 0.9) greater than the first coefficient H1 and smaller than 1. The corrected black K tone value Kc may be assigned with the same value as the uncorrected tone value Ki. In response to completion of the specification of the corrected tone values (e.g., the corrected tone values Cc, Mc, Yc, and Kc) of all of the color components of the target pixel CT, the processor 110 ends the distant pixel correction processing of step S630, i.e., the color pixel correction processing of FIG. 11.

As described above, the tone values of each of the print pixels included in the fifth partial area A5 depicted in FIG. 5B may be corrected by the distant pixel correction processing in step S630 of FIG. 11. Therefore, in the fifth partial area A5, the amount of each of C, M, and Y is reduced. In the distant pixel correction processing, the same second coefficient H2 may be used in correction of each C, M, and Y. Therefore, the color of the fifth partial area A5 chromatic color which has chromatic color before correction remains chromatic color after correction. The second coefficient H2 may be greater than the first coefficient H1. Therefore, the reduced amount of ink in the fifth partial area A5 may be less than the reduced amount of ink in the fourth partial area A4.

When a negative determination (e.g., "NO") is made in step S620 of FIG. 11, the processor 110 ends the color pixel correction processing of FIG. 11 without executing the correction processing on the target pixel CT. For example, when the target pixel CT is one of the print pixels included in the sixth partial area A6 of FIG. 5B, a negative determination (e.g., "NO") is made in each of steps S600 and S620 of FIG. 11. Therefore, the processor 110 does not execute correction processing and thus does not change the tone values of each of the print pixels included in the sixth partial area A6.

As described in FIGS. 5B, 7A, 7B, 7C, 9A, and 9B, in the illustrative embodiment, in one case, the processor 110 may execute the three-color correction processing (e.g., step S510) on each pixel included in the first partial area A1 which is included in the achromatic-color representation area Aa and is adjacent to one of the chromatic-color representation areas Ac1 and Ac2. In the three-color correction processing, the pixel value of the target pixel included in the first partial area A1 is corrected such that the amount of black K ink to be ejected onto the print unit area UA corresponding to the pixel is reduced to zero, the amount of at least one of C, M, and Y to be ejected onto the print unit area UA corresponding to the same pixel is increased, and the target pixel represents achromatic color. In another case, the processor 110 may execute the four-color correction processing (e.g., step S530) on each pixel included in the second partial area A2 which is included in the achromatic-color representation area Aa and is remote from the chromatic-color representation areas Ac1 and Ac2 and adjacent to the first partial area A1. In the four-color correction processing, the pixel value of the target pixel included in the second partial area A2 is corrected such that the amount of black K ink to be ejected onto the print unit area UA corresponding to the pixel is reduced to an amount greater than zero, the amount of at least one of C, M, and Y to be ejected onto the print unit area UA corresponding to the same pixel is increased, and the target pixel represents achromatic color.

As described above, in the first partial area A1, since the amount of black K ink is zero, bleeding of black K ink that may occur between each of the chromatic-color representation areas Ac1 and Ac2 and the first partial area A1 may be reduced. In the first partial area A1, the amount of at least one of C, M, and Y ink is increased. Therefore, the color change that may occur due to execution of correction on the first partial area A1 may be reduced. Since the amount of black K ink is greater than zero in the second partial area A2, the second partial area A2 represents achromatic color deeper than achromatic color represented by the other inks with no black K ink. Since such second partial area A2 is located between the first partial area A1 and the third partial area A3, an obstructiveness of difference in depth of achromatic color may be reduced as compared with a case where no second partial area A2 is located between the first partial area A1 and the third partial area A3. In the second partial area A2, the amount of black K ink is reduced to a value greater than zero and the amount of at least one of C, M, and Y ink is increased. Therefore, black K ink ejected onto the second partial area A2 tends to contact chromatic color ink ejected onto the same second partial area A2. That is, the number of the ejection areas EA (refer to FIG. 5C) onto which only black K ink is ejected may be reduced in the second partial area A2. In other words, the number of ejection areas EA in which black K ink contacts at least one of C, M, and Y inks may be increased in the print unit area UA corresponding to the print pixel PPx. Accordingly, as described in the example of FIG. 4D, intrusion of black K ink ejected onto the second partial area A2 into the first partial area A1 and/or the chromatic-color representation areas Ac1 and Ac2 (i.e., bleeding of black K ink) may be reduced.

It is assumed that, at least one of the print pixels (i.e., the print unit areas UA) included in the first partial area A1 has been corrected such that a condition that "the amount of black K ink should be reduced to zero, the amount of at least one of C, M, and Y inks should be increased, and the target pixel should represent achromatic color" is satisfied. It may be construed that the processor 110 corrects the pixel value of the at least one of the pixels included in the first partial area A1 such that the amount of black K ink to be ejected onto the print unit area UA corresponding to the pixel is reduced to zero, the amount of at least one of C, M, and Y inks is increased, and the target pixel represents achromatic color. Similar to this, when a pixel value of at least one of print pixels included in a partial area is corrected in the correction processing such that a particular condition is satisfied, this may be also the same as that the processor 110 corrects the pixel value of the at least one of the pixels included in the partial area such that the particular condition is satisfied. That is, one pixel may be corrected, or a plurality of pixels may be corrected.

As described in the example depicted in FIGS. 7B and 7C, the pixel value of each of the pixels included in the third partial area A3 does not be corrected. The third partial area A3 is remote from the chromatic-color representation areas Ac1 and Ac2 and the first partial area A1 and is adjacent to the second partial area A2. Accordingly, as compared with a case where the entire portion of the achromatic-color representation area Aa is corrected, thinning of the color in the achromatic-color representation area Aa may be reduced.

As described in step S330 of FIG. 6, in a case that the tone value (i.e., the amount of ink) of black K ink which is achromatic color ink is greater than or equal to the black threshold Kth, the black pixel correction processing of step S335 is executed. As described above, the black pixel correction processing is executed on a pixel having the tone value representing the amount of black K ink is greater than or equal to the threshold among the pixels included in one of the first partial area A1 and the second partial area A2. Accordingly, execution of excessive correction on any pixel onto which a relatively small amount of black K ink is to be ejected may be reduced, whereby unnatural-looking color in a print result may be reduced.

As described in FIG. 11, the pixel value of each pixel included in the fourth partial area A4 is corrected such that the amount of at least one of the chromatic color inks (e.g., C, M, and Y inks) to be ejected onto the print unit area UA corresponding to the pixel is reduced and the target pixel represents chromatic color. The fourth partial area A4 is included in one of the chromatic-color representation areas Ac1 and Ac2 (refer to FIG. 5B) and is adjacent to the achromatic-color representation area Aa. Therefore, a difference in amount of chromatic color ink may be reduced between the first partial area A1 and the fourth partial area A4 adjacent to each other. Accordingly, ink bleeding that may occur between the first partial area A1 and the fourth partial area A4 may be reduced.

The fifth partial area A5 is located between the fourth partial area A4 and the sixth partial area A6. The reduced amount of each of the C, M, and Y tone values in the fifth partial area A5 is smaller than the reduced amount of each of the C, M, and Y tone values in the fourth partial area A4. Accordingly, as compared with a case where the fourth partial area A4 and the sixth partial area A6 are adjacent to each other with no fifth partial area A5 located therebetween, a difference in depth of chromatic color may be reduced.

As described in step S530 of FIGS. 7B and 7C and in FIGS. 10B and 10C, the black K tone value of the target pixel CT included in the second partial area A2 is corrected such that a less amount of black K ink is specified with a greater weighting factor Wn. As described in step S530 of FIGS. 7B and 7C and in FIGS. 10B and 10C, the weighting factor Wn is calculated using a tone value of a particular pixel that satisfies the first correction condition, among the pixels located at the first distant position or at the second distant position with respect to the target pixel CT. Generally, the particular pixel may be included in one of the chromatic-color representation areas Ac1 and Ac2. The weighting factor Wn may have a greater value with at least one of the tone values Cn, Mn, and Yn of the chromatic color inks (e.g., C, M, and Y) of the particular pixel having a relatively greater value. As described above, the tone values of the target pixel CT included in the achromatic-color representation area Aa are corrected such that the amount of the achromatic color ink (e.g., K ink) of the target pixel CT is reduced greater as the amount of at least one of the chromatic color inks (e.g., C, M, and Y inks) to be ejected onto the particular pixel included in one of the chromatic-color representation areas Ac1 and Ac2 is relatively greater.

In a case that a relatively large amount of chromatic color ink is ejected onto a particular pixel included in one of the chromatic-color representation areas Ac1 and Ac2, the chromatic color ink landed on the particular pixel may tend to move toward the target pixel CT included in the achromatic-color representation area Aa (e.g., the chromatic color ink may move toward the first partial area A1 from one of the chromatic-color representation areas Ac1 and Ac2). Therefore, the achromatic color ink on the target pixel CT included in the second partial area A2 may be drawn by ink moved to the first partial area A1 and thus exceeds the boundary between the achromatic-color representation area Aa and the one of the chromatic-color representation areas Ac1 and Ac2, whereby ink bleeding may occur. In the illustrative embodiment, in a case that the amount of chromatic color ink for the particular pixel included in one of the chromatic-color representation areas Ac1 and Ac2 is relatively large, the amount of black K ink for the target pixel included in the second partial area A2 may be relatively small. Accordingly, bleeding of achromatic color ink in the second partial area A2 may be reduced.

As depicted in FIGS. 10B and 10C, in the formula for calculating the weighting factor Wn, the relative coefficients assigned to the C, M, and Y tone values Cn, Mn, and Yn are 1/4, 1/1, and 1/2, respectively, which are not equal to each other. This is because an obstructiveness of bleeding of black K ink caused by chromatic color ink varies among different chromatic color inks (e.g., among C, M, and Y inks). In the illustrative embodiment, it is assumed that bleeding of black K ink caused by magenta M ink may be more obstructive than bleeding of black K ink caused by yellow Y ink and bleeding of black K ink caused by yellow Y ink is more obstructive than bleeding of black K ink caused by cyan C ink. Under such circumstances, when magenta M ink is ejected onto a particular pixel that satisfies the first correction condition, bleeding of black K ink caused at a target pixel may be more obstructive than a case where yellow Y ink is ejected onto the particular pixel. When yellow Y ink is ejected onto the particular pixel, bleeding of black K ink caused at the target pixel may be more obstructive than a case where cyan C ink is ejected onto the particular pixel.

Therefore, in the illustrative embodiment, the tone values to which a greater relative coefficient is assigned are, in order, Mn, Yn, and Cn. A percentage of the reduction amount of the black K tone value for the target pixel relative to the tone value Mn of magenta M for the particular pixel is greater than a percentage of the reduction amount of the black K tone value for the target pixel relative to the tone value Yn of yellow Y for the particular pixel. The percentage of the reduction amount of the black K tone value for the target pixel relative to the tone value Yn of yellow Y for the particular pixel is greater than a percentage of the reduction amount of the black K tone value for the target pixel relative to the tone value Cn of cyan C for the particular pixel. As described above, in a case that an obstructiveness of bleeding of achromatic color ink (e.g., K) varies among different chromatic color inks (e.g., C, M, and Y inks), the amount of achromatic color ink to be ejected onto the achromatic-color representation area Aa may be reduced appropriately in accordance with each of the amounts of different chromatic color inks to be ejected onto the chromatic-color representation areas Ac1 and Ac2. Accordingly, ink bleeding may be reduced appropriately.

As described in step S310 of FIG. 6, when the print resolution is higher than the predetermined threshold, the tone value correction does not be executed. When the print resolution is lower than or equal to the predetermined threshold, the tone value correction is executed. Therefore, in a case that the print resolution is relatively high, execution of excess correction may be reduced, thereby reducing unnatural-looking color in a print result. In a case that the print resolution is relatively low, the tone value correction is executed, thereby reducing ink bleeding.

As described in step S305 of FIG. 6, when "plain paper" is not to be used as a recording medium (e.g., when "glossy paper" or "matte paper" is to be used as a recording medium), the tone value correction does not be executed. When "plain paper" is to be used as a recording medium, the tone value correction is executed. "Plain paper" may be a recording medium on which ink bleeding tends to occur as compared with other types of recording media. As described above, when a recording medium on which ink is less likely to bleed than "plain paper" is to be used, the tone value correction does not be executed. Therefore, execution of excess correction may be reduced, thereby reducing unnatural-looking color in a print result which may be caused by an obstructiveness of difference in depth of achromatic color. When "plain paper" on which ink is likely to bleed is to be used, the tone value correction is executed, thereby reducing ink bleeding.

In a case that the tone value correction is executed in step S420 of FIG. 7A, the first partial area A1 (refer to FIG. 5B) has a width of one pixel in the first direction DR1 and the second partial area A2 has a width of one pixel in the first direction DR1. In a case that the tone value correction is executed in step S410 of FIG. 7A, the first partial area A1 has a width of two pixels in the first direction DR1 and the second partial area A2 has a width of two pixels in the first direction DR1. As described above, each of the partial areas A1 and A2 has a different width in accordance with the determination result in step S400. Therefore, ink bleeding may be reduced appropriately in accordance with the determination result in step S400.

As described in step S400 of FIG. 7, the partial areas A1 and A2 have a relatively wider width when "slow-dry paper" (i.e., plain paper on which ink is likely to bleed)" is to be used as a recording medium. The partial areas A1 and A2 may have a relatively narrower width when "quick-dry paper" (i.e., plain paper on which ink is less likely to bleed)" is to be used as a recording medium. As described above, in a case that "plain paper on which ink is likely to bleed" is used, the partial areas A1 and A2 have a relatively wider width as compared with a case where "plain paper on which ink is less likely to bleed" is used, thereby reducing ink bleeding.

In FIGS. 5A and 5B, the achromatic-color representation area Aa and the chromatic-color representation areas Ac1 and Ac2 are located side by side along the first direction DR1. As depicted in FIG. 8, the pixels located at the first neighboring position (e.g., the pixels L1, R1, U1, and D1), the pixels located at the first distant position (e.g., the pixels L2, R2, U2, and D2), the pixels located at the second neighboring position (e.g., the pixels L1, L2, R1, R2, U1, U2, D1, and D2), and the pixels located at the second distant position (e.g., the pixels L3, L4, R3, R4, U3, U4, D3, and D4) are distributed in the directions parallel to the first direction DR1 and the directions parallel to the second direction DR2 with respect to the target pixel CT. Therefore, when the achromatic-color representation area Aa and the chromatic-color representation areas Ac1 and Ac2 are located side by side along the second direction DR2, the bleeding reduction processing may be also executed in a similar manner. For example, in the black-pixel wide-range correction processing in step S410 of FIG. 7A, each of the partial areas A1 and A2 may have a width of two pixels in the second direction DR2. In the black-pixel narrow-range correction processing in step S420 of FIG. 7A, each of the partial areas A1 and A2 may have a width of one pixel in the second direction DR2. When the achromatic-color representation area Aa and the chromatic-color representation areas Ac1 and Ac2 are located side by side along a direction angled relative to the first direction DR1, the bleeding reduction processing may be also executed in a similar manner.

B. Variations (1) The processing executed in step S510 of each of FIGS. 7B and 7C (i.e., the correction processing in the first partial area A1 (refer to FIG. 5B)) does not be limited to the specific example depicted in FIG. 9. In one example, the value added to each of the C, M, and Y tone values may be a value other than the first value Di1. For example, a value obtained by multiplication of the first value Di1 by a predetermined coefficient may be added to each of the C, M, and Y tone values. In another example, different values may be added to the C, M, and Y tone values, respectively. In any case, it is preferable that the value added to each of the tone values of C, M, and Y may be specified such that a mixed color of C, M, and Y to which a certain value is added represents the same color as K from which a certain value is reduced. That is, it is preferable that the color to be used for printing not be changed due to the tone value correction. For example, processing for correcting tone values of a pixel included in the first partial area A1 of the achromatic-color representation area Aa such that the amount of achromatic color ink (e.g., black K ink) to be ejected onto the print unit area UA corresponding to the pixel is reduced to zero, the amount of at least one of three or more chromatic color inks (e.g., C, M, and Y inks) to be ejected onto the same print unit area UA is increased, and the pixel represents achromatic color, may be executed.

The processing executed in S530 of FIGS. 7B and 7C (i.e., the correction processing in the second partial area A2 (refer to FIG. 5B)) does not be limited to the specific exampled depicted in FIG. 10. In one example, in FIG. 10A, the reference value Kx may change curvedly relative to the change of the tone value Ki. In another example, the value added to each of the C, M, and Y tone values may be a value other than the value subtracted from the K tone value. In still another example, different values may be added to the C, M, and Y tone values, respectively. In yet another example, the same coefficient may be used for C, M, and Y in the formula for calculating the weighting factor Wn. In further example, the weighting factor Wn may be calculated using the tone value of at least one of color components of C, M, and Y. In a still further example, in the processing of FIG. 10, the weighting factor Wn, the weighted first value Di1w, and the weighted second value Di2w does not necessarily be used. For example, the corrected black K tone value Kc may be a value obtained by subtraction of the first value Di1x from the uncorrected tone value Ki, and the corrected C, M, and Y tone values Cc, Mc, and Yc may be values obtained by addition of the first value Di1x to the uncorrected C, M, and Y tone values Ci, Mi, and Yi, respectively (e.g., in the case where Di1x≤Di2). In any case, it is preferable that the value added to each of the tone values of C, M, and Y may be specified such that a mixed color of C, M, and Y to which a certain value is added represents the same color as K from which a certain value is reduced. That is, it is preferable that the color to be used for printing not be changed due to the tone value correction. For example, processing for correcting tone values of a pixel included in the second partial area A2 of the achromatic-color representation area Aa such that the amount of achromatic color ink (e.g., black K ink) to be ejected onto the print unit area UA corresponding to the pixel is reduced to a value greater than zero, the amount of at least one of three or more chromatic color inks (e.g., C, M, and Y inks) to be ejected onto the same print unit area UA is increased, and the pixel represents achromatic color, may be executed.

In any case, the first partial area A1 may have a width of three pixels or more, and the second partial area A2 may also have a width of three pixels or more. In another example, the first partial area A1 may have a predetermined fixed width and the second partial area A2 may have a width changeable in accordance with the recording media type. For example, in step S500a of FIG. 7C, instead of the pixel located at the second neighboring position, the pixel located at the first neighboring position may be used as a target for determination similar to step S500 of FIG. 7B. In step S520a of FIG. 7C, a range of two pixels (e.g., the second and third pixels from the target pixel) (e.g., the pixels L2, L3, R2, R3, U2, U3, D2, and D3) farther from the target pixel than the pixel located at the first neighboring position may be used for searching a pixel that satisfies the first correction condition. In still another example, the second partial area A2 may have a predetermined fixed width and the first partial area A1 may have a width changeable in accordance with the recording media type. In yet another example, the first partial area A1 and the second partial area A2 may have respective predetermined fixed widths irrespective of the recording media type.

In other variations, for example, another condition may be used as the condition for changing the width of at least one of the partial areas A1 and A2, instead of the recording media type. For example, in a case that the print execution unit 290 is capable of using multiple types of ink sets, the width of at least one of the partial areas A1 and A2 may be changed in accordance with the ink set type. For example, in a case that an ink set of which ink is likely to bleed is used, at least one of the partial areas A1 and A2 may have a wider width as compared with a case where an ink set of which ink is less likely to bleed.

In the illustrative embodiment depicted in FIGS. 7B, 7C, and 8, the widths of the partial areas A1 and A2 are specified in accordance with which one of the neighboring position and the distant position is used in each of steps S500, S500a, S520, and S520a. More specifically, for example, the range of the neighboring position from the target pixel CT corresponds to the width of the first partial area A1. For example, the distance from the target pixel CT to the first neighboring position in step S500 is one pixel only, and therefore, the range of the first neighboring position from the target pixel CT in step S500 is one pixel. The distance from the target pixel CT to the second neighboring position in step S500a two pixels, and therefore, the range of the second neighboring position from the target pixel CT in step S500a is two pixels. As described above, the width of the first partial area A1 may be adjusted by control of the range of the neighboring position from the target pixel CT, and the width of the second partial area A2 may be adjusted by control of the range of the distant position from the target pixel CT. In other variations, for example, the neighboring position and the distant position may be diagonal to the target pixel CT in the first direction DR1. The width direction is not limited to the first direction DR1 and the second direction DR2. In other variations, for example, a direction orthogonal to a boundary between the achromatic-color representation area and the chromatic-color representation area (e.g., the boundary lines B1 and B2 in FIG. 5B) may be used.

(2) In other variations, for example, the achromatic-color representation area Aa does not necessarily include the third partial area A3 (refer to FIG. 5B). The achromatic-color representation area Aa may include the first partial area A1 and the remainder that may be treated as the second partial area A2 in the processing executed in each of FIGS. 7A, 7B, and 7C. In other variations, for example, steps S520 and S520a may be omitted. In this case, when a negative determination ("NO") is made in step S500 or S500a, step S530 may be executed at all times.

(3) In other variations, for example, each of the chromatic-color representation areas Ac1 and Ac2 does not necessarily include the fifth partial area A5 (refer to FIG. 5B). Each of the chromatic-color representation areas Ac1 and Ac2 may include the fourth partial area A4 and the remainder that may be treated as the sixth partial area A6 in the processing executed in FIG. 11. In other variations, for example, steps S620 and S630 may be omitted. In this case, when a negative determination ("NO") is made in step S600, the correction processing on the target pixel CT may be omitted.

(4) In the bleeding reduction processing of FIG. 6, even when, in step S330, the black pixel criterion is not satisfied, the black pixel correction processing of step S335 may be executed on a pixel included in the area representing achromatic color. For example, in step S330, when the color represented by the tone values of the target pixel CT is achromatic color, a positive determination (e.g., "YES") may be made. The determination condition given in step S330 may be that the color represented by the tone values of the target pixel CT should be achromatic color and the tone value of achromatic color ink (e.g., black K) should be greater than or equal to the predetermined black threshold Kth. In the illustrative embodiment depicted in FIG. 6, the determination condition given in step S330 does not include the condition that the color of the target pixel CT should be achromatic color. Accordingly, the execution of step S335 may also reduce bleeding of black K ink in the achromatic-color representation area as well as bleeding of black K ink in the chromatic-color representation area.

The bleeding reduction processing of FIG. 6 does not necessarily include steps S340 and S345. In this case, when a negative determination (e.g., "NO") is made in step S330, the processor 110 does not execute the correction processing on the target pixel and thus the routine proceeds to step S350. Thus, the tone values of the pixel included in the chromatic-color representation areas Ac1 and Ac2 of FIG. 5B do not be corrected.

In other variations, for example, in the bleeding reduction processing of FIG. 6, the correction processing may be executed irrespective of the print resolution. In this case, for example, step S310 may be omitted. In another example, in the bleeding reduction processing of FIG. 6, the correction processing may be executed irrespective of the recording media type. In this case, for example, step S305 may be omitted.

(5) The bleeding reduction processing does not necessarily be executed between steps S220 and S230 in FIG. 3. In other variations, for example, the bleeding reduction processing may be executed at a different timing during print processing. In other variations, for example, in the color conversion processing of step S220, the tone values before color conversion may be converted into respective corrected tone values. In other variations, for example, different lookup tables may be provided for the respective partial areas A1, A2, A3, A4, A5, and A6. In this case, RGB image data representing the tone values before color conversion may correspond to target image data of the bleeding reduction processing. In other variations, for example, in the halftone processing of step S230, the dot formation patterns corresponding to the corrected tone values may be determined. In other variations, for example, different dither matrixes may be provided for the respective partial areas A1, A2, A3, A4, A5, and A6. In this case, CMYK image data that represents C, M, Y, and K tone values and a target of the halftone processing may correspond to target image data of the bleeding reduction processing. The dot formation patterns determined in the halftone processing of step S230 may be changed in the correction processing. In other variations, for example, in the first partial area A1, each of black K dots may be replaced with a combination of three dots of C, M, and Y. In another example, in the second partial area A2, a predetermined percent (e.g., 50%) of black K dots may be replaced with a combination of three dots of C, M, and Y. In this case, the image data representing the dot formation patterns (e.g., CMYK binary image data) may correspond to target image data of the bleeding reduction processing. In any case, it may be construed that the processor 110 corrects the pixel value. When the processor 110 executes the bleeding reduction processing, the processor 110 may obtain target image data from the internal storage device (e.g., one of the volatile storage device 120 and the nonvolatile storage device 130) of the image processing device 100 or the external storage device (e.g., a server (not depicted)) connected to the image processing device 100.

(6) In other variations, for example, the print execution unit 290 may have another configuration. For example, chromatic color ink available for printing may include, in addition to C, M, and Y inks, light cyan ink having lighter density than cyan C ink, light magenta ink having lighter density than magenta M ink, and dark yellow ink having heavier density than yellow Y ink. It may be preferable that three or more varieties of chromatic color inks, of which mixture can represent achromatic color, be used as chromatic color ink.

(7) In other variations, for example, the processor 210 of the multifunction device 200 may execute the print processing of FIG. 3 in accordance with the program 232, instead of the image processing device 100. In this case, the processor 210 of the multifunction device 200 may operate as the image processing device. The controller 298 of the print execution unit 290 may execute one or more steps (e.g., steps S230 and S240) of the print processing of FIG. 3. The print execution unit 290 does not necessarily include the controller 298. In this case, the image processing device may control the print execution unit 290 directly. In any case, print data may be data in various formats that may represent input image and may be used for controlling the print execution unit 290.

(8) The image processing device 100 depicted in FIG. 2 may be another device (e.g., a digital camera or a scanner) than the personal computer. The device including the print execution unit may be another device (e.g., a printer having a single function) than the multifunction device 200. The image processing device may be incorporated into a device including the print execution unit. A plurality of devices (e.g., computers) capable of communicating with each other via a network may share functions of the image processing executed by the image processing device and implement the functions of the image processing as a whole (e.g., a system including such device may correspond to the image processing device).

Part of the configurations implemented by hardware in the illustrative embodiment may be replaced with software, or conversely, part of the configurations implemented by software in the above-described illustrative embodiment may be replaced with hardware. For example, the functions of steps S220, S225, S230, and S240 in FIG. 3 may be implemented by a specifically designed hardware circuit.

When part or all of the functions are implemented by a computer program, the program may be provided by being stored in a computer-readable recording medium (e.g., a non-transitory recording medium). In one example, the program may be executed with from the same recording medium (e.g., a computer-readable recording medium) on which the program is supplied. In another example, the program may be executed from a different recording medium (e.g., a computer-readable recording medium) than the recording medium on which the program is supplied. The "computer-readable recording medium" does not be limited to a portable recording medium, such as a memory card or a CD-ROM, and may include an internal storage device of a computer, such as various ROMs, and an external storage device connected to a computer, such as a hard disk drive.

Although the disclosure has been described based on illustrative embodiments and variations, the illustrative embodiments of the disclosure facilitate the understanding of the disclosure and do not limit the disclosure. The disclosure may be changed or modified without departing from the spirit of the invention and the scope of the claims and includes the equivalents thereof.

What is claimed is:

1. An image processing device comprising a hardware processor configured to cause the image processing device to perform:
    acquiring target image data;
    generating print data by using the target image data;
    supplying the print data to a print execution unit for causing the print execution unit to print, the print execution unit having a plurality of nozzles, each of which ejects one of a plurality of color inks, the plurality of color inks including an achromatic color ink and three or more types of chromatic color inks, colors of which are different from each other;
    wherein a target image represented by the target image data includes a chromatic-color representation area and an achromatic-color representation area, the chromatic-color representation area representing the chromatic color, and the achromatic-color representation area representing the achromatic color,
    wherein the generating print data comprises executing a correction process, the correction process being for correcting a plurality of pixel values in the target image data corresponding to the achromatic-color representation area,
    wherein the correction process includes a first correction process and a second correction process,
    wherein the first correction process comprises correcting a pixel value of a first target pixel in the target image data corresponding to a first partial area, which is included in the achromatic-color representation area and is adjacent to the chromatic-color representation area, such that the achromatic color ink which is to be ejected on a first print unit area in the first partial area corresponding to the first target pixel decreases to be zero, wherein at least one of the three or more types of chromatic color inks which is to be ejected on the first print unit area corresponding to the first target pixel increases, and wherein the first print unit area represents the achromatic color,
    wherein the second correction process comprises correcting a pixel value of a second target pixel in the target image data corresponding to a second partial area, which is included in the achromatic-color representation area and is adjacent to the first partial area and is remote from the chromatic-color representation area, such that the achromatic color ink which is to be ejected on a second print unit area in the second partial area corresponding to the second target pixel decreases to a specific value more than zero, wherein at least one of the three or more types of chromatic color inks which is to be ejected on the print unit area corresponding to the second target pixel increases, and wherein the second print unit area represents the achromatic color.

2. The image processing device as in claim 1,
    wherein the hardware processor is further configured to cause the image processing device to perform:
    selecting a pixel from a plurality of pixels in the target image data corresponding to the achromatic-color representation area; and
    determining whether the selected pixel exists in the target image data corresponding to one of the first partial area or the second partial area,
    wherein, in a case that the selected pixel exists in the target image data corresponding to the first partial area, the first correction process is executed to the selected pixel, and
    wherein, in a case that the selected pixel exists in the target image data corresponding to the second partial area, the second correction process is executed to the selected pixel.

3. The image processing device as in claim 1, wherein:
    the target image data includes a third target pixel, the third target pixel corresponding to a third partial area, the third partial area being a part of the achromatic-color representation area which is adjacent to the second partial area and is remote from both the chromatic-color representation area and the first partial area, and
    through the correction process, a pixel value of the third target pixel is not corrected.

4. The image processing device as in claim 1, wherein:
    the correction process is executed on a plurality of pixels in the target image data corresponding to the achromatic-color representation area, each of the plurality of the pixels upon which the correction process is executed having a pixel value indicating that the amount of the achromatic color ink is equal to or more than a threshold value.

5. The image processing device as in claim 1, wherein:
    through the correction process, a fourth target pixel in the target image data corresponding to a fourth partial area, which is a part of the chromatic-color representation area and is adjacent to the achromatic-color representation area, is corrected in such a way that the at least one of the three or more types of chromatic color inks which is to be ejected on a fourth print unit area in the fourth partial area corresponding to the fourth target pixel decreases, and
    the fourth print unit area represents the chromatic color.

6. The image processing device as in claim 1,
    wherein the first correction process comprises correcting a pixel value of a first target pixel such that an achromatic color component of the pixel value is decreased to be zero, and wherein at least one of three or more types of chromatic color components of the pixel value is increased, wherein the second correction process comprises correcting a pixel value of a second target pixel such that the achromatic color component of the pixel value is decreased to a specific value more than zero, and wherein the at least one of the three or more types of chromatic color components of the pixel value is increased.

7. The image processing device as in claim 6,
wherein the first correction process comprises correcting a pixel value of a first target pixel such that the achromatic color component of the pixel value is decreased from a value X to be zero, and wherein at least one of the three or more types of chromatic color components of the pixel value is increased by the value X,
wherein the second correction process comprises correcting a pixel value of a second target pixel such that the achromatic color component of the pixel value is decreased from a value Y to a specific value more than zero, and wherein the at least one of the three or more types of chromatic color components of the pixel value is increased by a value that is equal to the value Y minus the specific value more than zero.

8. The image processing device as in claim 7,
wherein the value X and the value Y are different from each other.

9. The image processing device as in claim 7,
wherein the specific value more than zero is determined based on the at least one of the three or more types of chromatic color components of a pixel near the second target pixel in the target image data corresponding to the chromatic color representation area.

10. The image processing device as in claim 1, wherein:
the second target pixel corresponding to the second partial area is corrected in such a way that as the amount of at least one of the three or more types of chromatic color inks which is represented by a pixel value of a specific pixel is increased, the amount of the achromatic color ink represented by the corrected pixel value of the second target pixel is decreased, and
a location corresponding to the specific pixel in the chromatic-color representation area is selected on the basis of the second target pixel.

11. The image processing device as in claim 10, wherein:
the three or more types of chromatic color inks include a first chromatic color ink and a second chromatic color ink, and
(A) a ratio of the decreased amount of the achromatic color ink represented by the pixel value of the second target pixel to the amount of the first chromatic color ink represented by the pixel value of the specific pixel is larger than (B) a ratio of the decreased amount of the achromatic color ink represented by the pixel value of the second target pixel to the amount of the second chromatic color ink represented by the pixel value of the specific pixel.

12. The image processing device as in claim 1, wherein:
the correction process is not executed in a case where the printing process is executed according to a first print resolution more than a specific print resolution, and
the correction process is executed in a case where the printing process is executed according to a second print resolution equal to or less than the specific print resolution.

13. The image processing device as in claim 1, wherein:
the correction process is not executed in a case where the printing process is executed by using a first type of printing medium, and
the correction process is executed in a case where the printing process is executed by using a second type of printing medium, the second type of printing medium having a feature that bleeding of the color ink is more likely to happen relative to use of the first type of printing medium.

14. The image processing device as in claim 1, wherein:
at least one of a width of the first partial area in a specific direction and a width of the second partial area in the specific direction is changed according to a specific condition.

15. The image processing device as in claim 14, wherein:
the correction process is not executed in a case where the printing process is executed by using a first type of printing medium,
the correction process is executed in a case where the printing process is executed by using a second type of printing medium, the second type of printing medium having a feature that bleeding of the color ink is more likely to happen relative to use of the first type of printing medium,
the second type of printing medium includes a first printing medium and second printing medium, the first printing medium having a feature that a color ink dries quicker than that of the second printing medium, and
at least one of the following conditions is satisfied:
(a) the width of the first partial area in the specific direction in a case where the printing process is executed by using the second printing medium is wider than that in a case where the printing process is executed by using the first printing medium; and
(b) the width of the second partial area in the specific direction in a case where the printing process is executed by using the second printing medium is wider than that in a case where the printing process is executed by using the first printing medium.

16. The image processing device as in claim 1,
wherein the image processing device further comprises:
a memory storing instructions, the instructions, when executed by the hardware processor, causing the image processing device to perform the acquiring, the generating, and the supplying.

17. A non-transitory computer-readable medium storing computer-readable instructions for an image processing device, the computer-readable instructions comprising instructions to implement:
acquiring target image data;
generating print data by using the target image data;
supplying the print data to a print execution unit for causing the print execution unit to print, the print execution unit having a plurality of nozzles, each of which ejects one of a plurality of color inks, the plurality of color inks including an achromatic color ink and three or more types of chromatic color inks, colors of which are different from each other;
wherein a target image represented by the target image data includes a chromatic-color representation area and an achromatic-color representation area, the chromatic-color representation area representing the chromatic color, and the achromatic-color representation area representing the achromatic color,
wherein the generating print data comprises executing a correction process, the correction process being for correcting a plurality of pixel values in the target image data corresponding to the achromatic-color representation area, wherein the correction process includes a first correction process and a second correction process, wherein the first correction process comprises correcting a pixel value of a first target pixel in the target image data corresponding to a first partial area, which is included in the achromatic-color representation area and is adjacent to the chromatic-color representation area, such that the achromatic color ink which is to be ejected on a first print unit area in the first partial area corresponding to the first target pixel decreases to be zero, wherein at least one of the three or more types of chromatic color inks which is to be ejected on the first print unit area corresponding to the first target pixel increases, and wherein the first print unit area represents the achromatic color, wherein the second correction process comprises correcting a pixel value of a second target pixel in the target image data corresponding to a second partial area, which is included in the achromatic-color representation area and is adjacent to the first partial area and is remote from the chromatic-color representation area, such that the achromatic color ink which is to be ejected on a second print unit area in the second partial area corresponding to the second target pixel decreases to a specific value more than zero, wherein at least one of the three or more types of chromatic color inks which is to be ejected on the print unit area corresponding to the second target pixel increases, and wherein the second print unit area represents the achromatic color.

* * * * *